US006119223A

United States Patent [19]
Witt

[11] Patent Number: 6,119,223
[45] Date of Patent: Sep. 12, 2000

[54] MAP UNIT HAVING RAPID MISPREDICTION RECOVERY

[75] Inventor: David B. Witt, Austin, Tex.

[73] Assignee: Advanced Micro Devices, Inc., Sunnyvale, Calif.

[21] Appl. No.: 09/127,294

[22] Filed: Jul. 31, 1998

[51] Int. Cl.$^7$ .................................................. G06F 11/07
[52] U.S. Cl. .................................. 712/244; 712/41; 709/1
[58] Field of Search ................................ 712/23, 41, 244; 709/1

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 712/215 |
| 4,858,105 | 8/1989 | Kuriyama et al. | 712/235 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0 463 628 | 1/1992 | European Pat. Off. . |
| 0 518 469 | 12/1992 | European Pat. Off. . |
| 0 541 216 | 5/1993 | European Pat. Off. . |
| 0 730 225 | 9/1996 | European Pat. Off. . |
| 0 854 343 | 7/1998 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Gwennap, L, "Hal Reveals Multichip SPARC Processor; High Performance CPU for Hal Systems Only—No Merchant Sales," Microprocessor Report, Mar. 6, 1995, vol. 9, No. 3, 7 pages.

(List continued on next page.)

*Primary Examiner*—Eric Coleman
*Attorney, Agent, or Firm*—Conley, Rose & Tayon, P.C.; Lawrence J. Merkel

[57] ABSTRACT

A processor employing a map unit including register renaming hardware is shown. The map unit may assign virtual register numbers to source registers by scanning instruction operations to detect intraline dependencies. Subsequently, physical register numbers are mapped to the source register numbers responsive to the virtual register numbers. The map unit may stores (e.g. in a map silo) a current lookahead state corresponding to each line of instruction operations which are processed by the map unit. Additionally, the map unit stores an indication of which instruction operations within the line update logical registers, which logical registers are updated, and the physical register numbers assigned to the instruction operations. Upon detection of an exception condition for an instruction operation with a line, the current lookahead state corresponding to the line is restored from the map silo. Additionally, physical register numbers corresponding to instruction operations within the line which are prior to the instruction operation experiencing the exception are restored into the current lookahead state. The map unit may use the same physical register to store both a condition code result and an integer result. The physical register number identifying the physical register is recorded for both the condition code register and the integer register. The map unit pops the previous renames from the architected renames block upon retiring one or more instruction operations. The popped physical register numbers are cammed against the updated architectural state. If a cam match is detected, the popped physical register is not freed.

16 Claims, 10 Drawing Sheets

U.S. PATENT DOCUMENTS

| | | | |
|---|---|---|---|
| 4,875,160 | 10/1989 | Brown | 712/228 |
| 4,928,223 | 5/1990 | Dao et al. | 712/247 |
| 5,053,631 | 10/1991 | Perlman et al. | 708/508 |
| 5,058,048 | 10/1991 | Gupta et al. | 708/508 |
| 5,119,483 | 6/1992 | Madden | 714/15 |
| 5,129,067 | 7/1992 | Johnson | 712/213 |
| 5,136,697 | 8/1992 | Johnson | 712/239 |
| 5,226,126 | 7/1993 | McFarland et al. | 712/218 |
| 5,226,130 | 7/1993 | Favor et al. | 712/238 |
| 5,546,554 | 8/1996 | Yung et al. | 711/203 |
| 5,630,149 | 5/1997 | Bluhm | 712/217 |
| 5,649,136 | 7/1997 | Shen | 712/244 |
| 5,651,125 | 7/1997 | Witt et al. | 712/218 |
| 5,682,492 | 10/1997 | McFarland | 712/214 |
| 5,778,210 | 7/1998 | Henstrom | 712/218 |
| 5,784,589 | 7/1998 | Bluhm | 712/217 |
| 5,805,918 | 9/1998 | Blomgren et al. | 712/43 |
| 5,966,530 | 10/1999 | Shen | 712/244 |

OTHER PUBLICATIONS

Gwennap, L, "MIPS R1000 Uses Decoupled Architecture—High Performance Core Will Drive MIPS High–End for Years," Microprocessor Report, Oct. 24, 1994, vol. 8, No. 14, 5 pages.

Franklin, et al, "The Expandable Split Window Paradigm for Exploiting Fine–Grain Parallelism", Computer Sciences Department, University of Wisconsin–Madison, Published by ACM, 1992, pp. 58–67.

Intel, "Chapter 2: Microprocessor Architecture Overview," 1994, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual vol. 1: Basic Architecture*", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

MAP UNIT HAVING RAPID MISPREDICTION RECOVERY

BACKGROUND OF THE INVENTION

1. Field of the Invention

This invention is related to the field of processors and, more particularly, to register renaming features of processors.

2. Description of the Related Art

Superscalar processors attempt to achieve high performance by issuing and executing multiple instructions per clock cycle and by employing the highest possible clock frequency consistent with the design. One method for increasing the number of instructions executed per clock cycle is out of order execution. In out of order execution, instructions may be executed in a different order than that specified in the program sequence (or "program order"). Certain instructions near each other in a program sequence may have dependencies which prohibit their concurrent execution, while subsequent instructions in the program sequence may not have dependencies on the previous instructions. Accordingly, out of order execution may increase performance of the superscalar processor by increasing the number of instructions executed concurrently (on the average).

Unfortunately, out of order execution presents additional hardware complexities for the processor. For example, a second instruction which is subsequent to a first instruction in program order may update a storage location which is read by the first instruction. In other words, the destination operand of the second instruction may be one of the source operands of the first instruction. For proper program execution, the first instruction must receive, as a source operand, the value stored in the storage location prior to execution of the second instruction. Similarly, if the first and second instructions have a particular storage location as the destination operand, the result of the second instruction should be the value stored in the storage location subsequent to executing both the first and second instructions (and prior to executing a third instruction which updates the storage location).

Generally, instructions may have one or more source operands and one or more destination operands. The source operands are input values to be manipulated according to the instruction definition to produce one or more results (which are the destination operands). Source and destination operands may be memory operands stored in a memory location external to the processor, or may be register operands stored in register storage locations included within the processor. The instruction set architecture employed by the processor defines a number of architected registers. These registers are defined to exist by the instruction set architecture, and instructions may be coded to use the architected registers as source and destination operands. An instruction specifies a particular register as a source or destination operand via a register number (or register address) in an operand field of the instruction. The register number uniquely identifies the selected register among the architected registers. A source operand is identified by a source register number and a destination operand is identified by a destination register number.

In addition to the architected registers, some processors define additional microarchitected registers which may be used to hold temporary results during instruction execution. For example, some processors use microcoding techniques to handle the most complex instructions. Microcode routines are executed in response to the complex instructions and include a plurality of simpler instructions. The microcode routines may generate temporary results while executing the complex instruction. These microarchitected registers (or temporary registers) are assigned additional register numbers to identify the temporary registers uniquely from the architected registers. Together, the architected registers and temporary registers are referred to herein as logical registers.

A processor employing out of order execution may experience the above hazards with respect to register operands. A method for handling these hazards is register renaming. In register renaming, the processor implements a set of physical registers. The number of physical registers is greater than the number of logical registers specified by the instruction set architecture and microarchitecture of the processor. As instructions are issued, physical registers are assigned to the destination register operands of the instructions. A physical register number identifying the assigned physical register is provided for each destination operand, and an indication of which physical registers correspond to the logical registers is maintained by the processor. Subsequent instructions which have the logical registers as source operands are provided with the corresponding physical register number for reading the appropriate source operand. By assigning different physical registers to store the destination operands of each instruction, instructions may freely update their destination operands in any order, since different physical storage locations are being updated.

Unfortunately, the process of assigning physical register numbers to destination operands instructions and providing those physical register numbers to subsequent instructions having the destination operands as source operands may be complex and slow. Particularly difficult in superscalar processors is the assignment of physical register numbers to destination operands of instructions and providing the physical register numbers to subsequent dependent instructions which are passing through the register renaming hardware simultaneously with those instructions. A register renaming structure which may operate at higher frequency yet still handle renaming of multiple instructions per clock cycle is desired.

Register renaming presents difficulties when instructions experience exception conditions. As used herein, an exception refers to an error in the execution of instructions which requires subsequent instructions to be discarded and instruction fetch to be started at a different address. For example, branch misprediction is an exception condition. Processors may perform branch prediction to speculatively fetch, issue, and execute instructions subsequent to conditional branch instructions. If the prediction is incorrect, the instructions subsequent to the branch instruction are discarded and instructions are fetched according to execution of the branch instruction. Additional exception conditions may include address translation errors for addresses of memory operands and other architectural or microarchitectural error conditions.

Because register renaming may have been applied to instructions which are subsequently discarded due to an exception, the mapping of logical registers to physical registers must be recovered to a state consistent with the instruction experiencing the exception. In other words, the mapping of logical registers to physical registers should reflect the execution of instructions prior to the instruction experiencing the exception (in program order) and not reflect the execution of instructions subsequent to the instruction experiencing the exception. It is desirable for the recovery of the register rename map to be rapid so that instructions fetched in response to the exception may pass through the register renaming hardware as soon as they are available. If recovery of the register rename map is still occurring when newly fetched instructions reach the register renaming hardware, then the newly fetched instructions must be stalled until the register rename map is recovered. Performance of the processor are is thereby lost.

Still further, register renaming hardware generally includes a mechanism for reusing physical registers previously assigned to a destination operand of a particular instruction once the corresponding logical register has been committed to a value corresponding to a subsequent instruction. It is desirable to use the physical registers as efficiently as possible, and to also providing accurate method for freeing the physical registers once the subsequent state has been committed to the corresponding logical register.

SUMMARY OF THE INVENTION

The problems outlined above are in large part solved by a processor employing a map unit including register renaming hardware. Various embodiments of the map unit employ a variety of techniques to increase the performance and efficiency of the register renaming mechanism.

In one embodiment, the map unit is configured to assign virtual register numbers to source registers by scanning instruction operations to detect intraline dependencies. If a dependency is not detected, a virtual register number indicating the current lookahead state is assigned. If a dependency is detected, a virtual register number indicating the issue position upon which the source register is dependent is assigned. Subsequently, physical register numbers are mapped to the source register numbers responsive to the virtual register numbers. In one implementation, the assignment of virtual register numbers and the mapping of virtual register numbers to physical register numbers are performed in separate pipeline stages. The register renaming mechanism may thereby be operable at higher clock frequencies. Performance of the processor may be increased to the extent that higher clock frequencies are achievable.

In another embodiment, the map unit stores (e.g. in a map silo) a current lookahead state corresponding to each line of instruction operations which are processed by the map unit. The current lookahead state identifies the physical register numbers assigned to each logical register prior to performing register renaming with respect to the line of instruction operations. Additionally, the map unit stores an indication of which instruction operations within the line update logical registers, which logical registers are updated, and the physical register numbers assigned to the instruction operations. Upon detection of an exception condition for an instruction operation with a line, the current lookahead state corresponding to the line is restored from the map silo. Additionally, physical register numbers corresponding to instruction operations within the line which are prior to the instruction operation experiencing the exception are restored into the current lookahead state. Advantageously, the current lookahead state may be rapidly recovered upon detecting an exception. Instruction operations fetched in response to the exception may be renamed upon arriving at the map unit, since the recovery of the current lookahead state may already be completed. Performance of the processor may thereby be increased.

In yet another embodiment, the map unit may improve efficiency of physical register usage by using the same physical register to store both a condition code result and an integer result. The physical register number identifying the physical register is recorded for both the condition code register and the integer register. In order to provide correct freeing of physical registers to be reused as renames, the map unit pops the previous renames from the architected renames block prior to updating the entries corresponding to a set of logical registers being committed in response to retiring one or more instruction operations. Prior to freeing the popped physical register numbers, the popped physical register numbers are cammed against the updated architectural state maintained by the architected renames block. If a cam match is detected, the popped physical register is not freed. Advantageously, more efficient use of the physical registers may be achieved and accurate freeing of the physical register may be achieved as well. In addition to using the physical registers more efficiently with respect to condition code register and integer register renaming, other optimizations may be possible using the present mechanism for freeing registers. For example, register—register moves may be accomplished by copying the source physical register number as the destination physical register number. The present mechanism may prevent inadvertent freeing of the physical register number in such a case as well.

Broadly speaking, a method for recovering a lookahead register state in a processor is contemplated. A lookahead register state is stored in a silo. The lookahead register state corresponds to a plurality of logical registers employed by the processor. Additionally, the lookahead register state corresponds to a state of the plurality of logical registers prior to a line of instruction operations. Physical register numbers assigned to destination operands within the line of instruction operations are also stored in the silo. Logical register numbers corresponding to the destination operands within the line of instruction operations are stored in the silo. An exception condition is detected upon executing a particular instruction operation within the line of instruction operations. The lookahead register state corresponding to the line of instruction operations is restored from the silo responsive to the detecting of the exception condition. The lookahead register state is selectively updated responsive to the physical register numbers and the logical register numbers stored in the silo.

Additionally a processor is contemplated. The processor may include a map unit and a silo. The map unit is configured to maintain a lookahead register state corresponding to a plurality of logical registers, the lookahead register state defining a physical register number corresponding to each of the plurality of logical registers. The register map unit is configured to update the lookahead register state responsive to destination operands corresponding to a line of instruction operations. The silo is configured to capture the lookahead register state prior to the map unit updating the lookahead register state responsive to the destination operands (a prior lookahead state). The silo is configured to retain the prior lookahead state as well as a plurality of physical register numbers assigned to the destination operands by the map unit and a plurality of logical register numbers specified by the destination operands. Additionally, upon receiving an exception indication corresponding to a particular instruction operation within the line of instruction operations, the silo is configured to restore the lookahead register state maintained by the map unit to the prior lookahead register state and to selectively update the lookahead register state responsive to the plurality of physical register numbers and the plurality of logical register numbers corresponding to the line of instruction operations.

Moreover, a computer system is contemplated. The computer system may include a processor and an I/O device. The processor may include a map unit and a silo. The map unit is configured to maintain a lookahead register state corresponding to a plurality of logical registers, the lookahead register state defining a physical register number corresponding to each of the plurality of logical registers. The register map unit is configured to update the lookahead register state responsive to destination operands corresponding to a line of instruction operations. The silo is configured to capture the lookahead register state prior to the map unit updating the lookahead register state responsive to the destination operands (a prior lookahead state). The silo is configured to retain the prior lookahead state as well as a plurality of physical register numbers assigned to the destination operands by the map unit and a plurality of logical register numbers specified by the destination operands. Additionally, upon receiving an exception indication corresponding to a particular instruction operation within the line of instruction operations, the silo is configured to restore the lookahead register state maintained by the map unit to the prior lookahead register state and to selectively update the lookahead register state responsive to the plurality of physical register numbers and the plurality of logical register numbers corresponding to the line of instruction operations. The I/O device is coupled to the processor, and is configured to communicate between the computer system and another computer system to which the I/O device is coupled.

BRIEF DESCRIPTION OF THE DRAWINGS

Other objects and advantages of the invention will become apparent upon reading the following detailed description and upon reference to the accompanying drawings in which.

Figure 1:
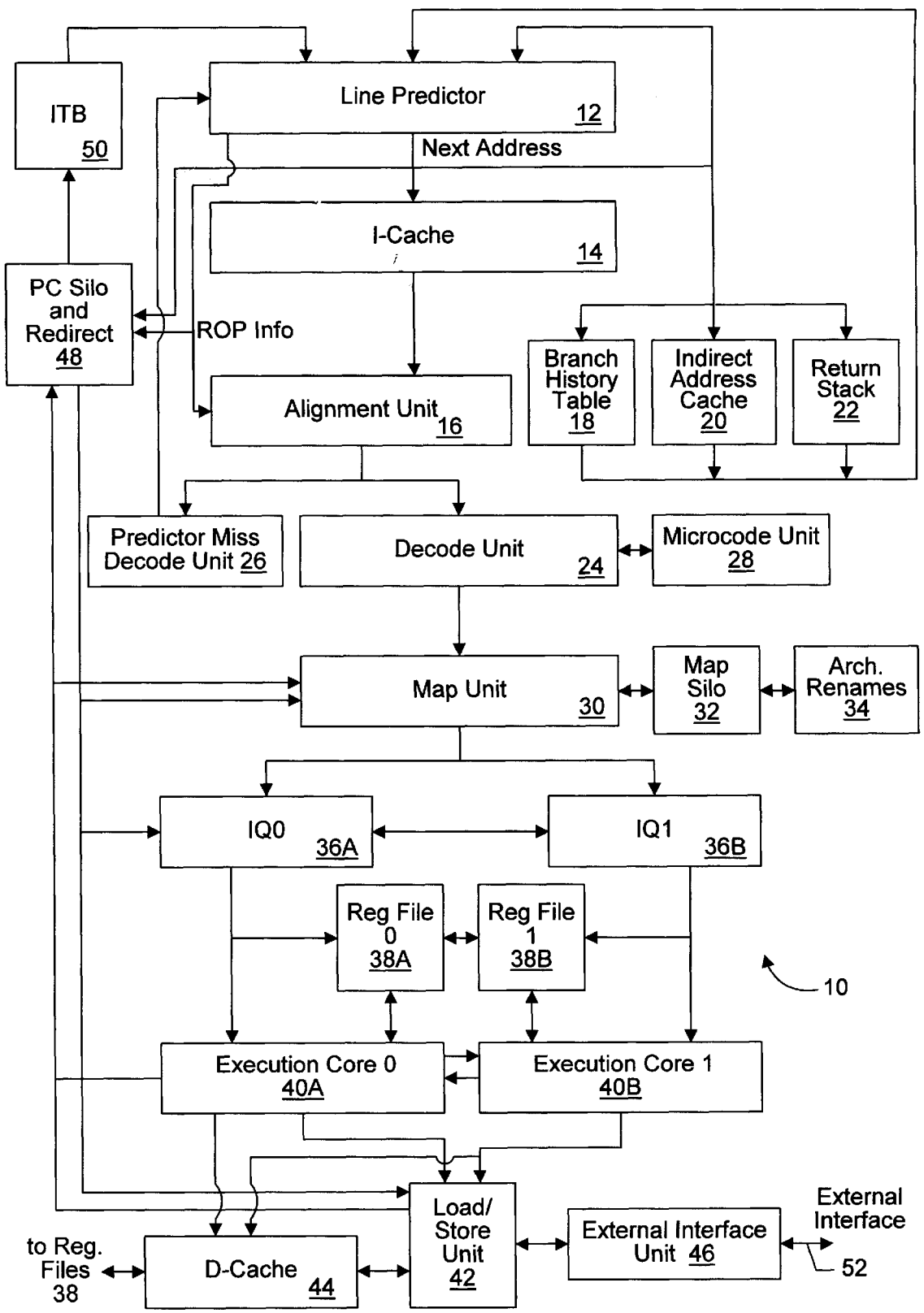
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch history table 18, an indirect address cache 20, a return stack 22, a decode unit 24, a predictor miss decode unit 26, a microcode unit 28, a map unit 30, a map silo 32, an architectural renames block 34, a pair of instruction queues 36A–36B, a pair of register files 38A–38B, a pair of execution cores 40A–40B, a load/store unit 42, a data cache (D-cache) 44, an external interface unit 46, a PC silo and redirect unit 48, and an instruction TLB (ITB) 50. Line predictor 12 is connected to ITB 50, predictor miss decode unit 26, branch history table 18, indirect address cache 20, return stack 22, PC silo and redirect block 48, alignment unit 16, and I-cache 14. I-cache 14 is connected to alignment unit 16. Alignment unit 16 is further connected to predictor miss decode unit 26 and decode unit 24. Decode unit 24 is further connected to microcode unit 28 and map unit 30. Map unit 30 is connected to map silo 32, architectural renames block 34, instruction queues 36A–36B, load/store unit 42, execution cores 40A–40B, and PC silo and redirect block 48. Instruction queues 36A–36B are connected to each other and to respective execution cores 40A–40B and register files 38A–38B. Register files 38A–38B are connected to each other and respective execution cores 40A–40B. Execution cores 40A–40B are further connected to load/store unit 42, data cache 44, and PC silo and redirect unit 48. Load/store unit 42 is connected to PC silo and redirect unit 48, D-cache 44, and external interface unit 46. D-cache 44 is connected to register files 38, and external interface unit 46 is connected to an external interface 52. Elements referred to herein by a reference numeral followed by a letter will be collectively referred to by the reference numeral alone. For example, instruction queues 36A–36B will be collectively referred to as instruction queues 36.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Line predictor 12 is configured to generate fetch addresses for I-cache 14 and is additionally configured to provide information regarding a line of instruction operations to alignment unit 16. Generally, line predictor 12 stores lines of instruction operations previously speculatively fetched by processor 10 and one or more next fetch addresses corresponding to each line to be selected upon fetch of the line. In one embodiment, line predictor 12 is configured to store 1K entries, each defining one line of instruction operations. Line predictor 12 may be banked into, e.g., four banks of 256 entries each to allow concurrent read and update without dual porting, if desired.

Line predictor 12 provides the next fetch address to I-cache 14 to fetch the corresponding instruction bytes.

I-cache 14 is a high speed cache memory for storing instruction bytes. According to one embodiment I-cache 14 may comprise, for example, a 256 Kbyte, four way set associative organization employing 64 byte cache lines. However, any I-cache structure may be suitable. Additionally, the next fetch address is provided back to line predictor 12 as an input to fetch information regarding the corresponding line of instruction operations. The next fetch address may be overridden by an address provided by ITB 50 in response to exception conditions reported to PC silo and redirect unit 48.

The next fetch address provided by the line predictor may be the address sequential to the last instruction within the line (if the line terminates in a non-branch instruction). Alternatively, the next fetch address may be a target address of a branch instruction terminating the line. In yet another alternative, the line may be terminated by return instruction, in which case the next fetch address is drawn from return stack 22.

Responsive to a fetch address, line predictor 12 provides information regarding a line of instruction operations beginning at the fetch address to alignment unit 16. Alignment unit 16 receives instruction bytes corresponding to the fetch address from I-cache 14 and selects instruction bytes into a set of issue positions according to the provided instruction operation information. More particularly, line predictor 12 provides a shift amount for each instruction within the line instruction operations, and a mapping of the instructions to the set of instruction operations which comprise the line. An instruction may correspond to multiple instruction operations, and hence the shift amount corresponding to that instruction may be used to select instruction bytes into multiple issue positions. An issue position is provided for each possible instruction operation within the line. In one embodiment, a line of instruction operations may include up to 8 instruction operations corresponding to up to 6 instructions. Generally, as used herein, a line of instruction operations refers to a group of instruction operations concurrently issued to decode unit 24. The line of instruction operations progresses through the pipeline of microprocessor 10 to instruction queues 36 as a unit. Upon being stored in instruction queues 36, the individual instruction operations may be executed in any order.

The issue positions within decode unit 24 (and the subsequent pipeline stages up to instruction queues 36) define the program order of the instruction operations within the line for the hardware within those pipeline stages. An instruction operation aligned to an issue position by alignment unit 16 remains in that issue position until it is stored within an instruction queue 36A–36B. Accordingly, a first issue position may be referred to as being prior to a second issue position if an instruction operation within the first issue position is prior to an instruction operation concurrently within the second issue position in program order. Similarly, a first issue position may be referred to as being subsequent to a second issue position if an instruction operation within the first issue position is subsequent to instruction operation concurrently within the second issue position in program order. Instruction operations within the issue positions may also be referred to as being prior to or subsequent to other instruction operations within the line.

As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines. Furthermore, embodiments employing non-CISC instruction sets may employ a single instruction operation for each instruction (i.e. instruction and instruction operation may be synonymous in such embodiments). In one particular embodiment, a line may comprise up to eight instruction operations corresponding to up to 6 instructions. Additionally, the particular embodiment may terminate a line at less than 6 instructions and/or 8 instruction operations if a branch instruction is detected. Additional restrictions regarding the instruction operations to the line may be employed as desired.

The next fetch address generated by line predictor 12 is routed to branch history table 18, indirect address cache 20, and return stack 22. Branch history table 18 provides a branch history for a conditional branch instruction which may terminate the line identified by the next fetch address. Line predictor 12 may use the prediction provided by branch history table 18 to determine if a conditional branch instruction terminating the line should be predicted taken or not taken. In one embodiment, line predictor 12 may store a branch prediction to be used to select taken or not taken, and branch history table 18 is used to provide a more accurate prediction which may cancel the line predictor prediction and cause a different next fetch address to be selected. Indirect address cache 20 is used to predict indirect branch target addresses which change frequently. Line predictor 12 may store, as a next fetch address, a previously generated indirect target address. Indirect address cache 20 may override the next fetch address provided by line predictor 12 if the corresponding line is terminated by an indirect branch instruction. Furthermore, the address subsequent to the last instruction within a line of instruction operations may be pushed on the return stack 22 if the line is terminated by a subroutine call instruction. Return stack 22 provides the address stored at its top to line predictor 12 as a potential next fetch address for lines terminated by a return instruction.

In addition to providing next fetch address and instruction operation information to the above mentioned blocks, line predictor 12 is configured to provide next fetch address and instruction operation information to PC silo and redirect unit 48. PC silo and redirect unit 48 stores the fetch address and line information and is responsible for redirecting instruction fetching upon exceptions as well as the orderly retirement of instructions. PC silo and redirect unit 48 may include a circular buffer for storing fetch address and instruction operation information corresponding to multiple lines of instruction operations which may be outstanding within processor 10. Upon retirement of a line of instructions, PC silo and redirect unit 48 may update branch history table 18 and indirect address cache 20 according to the execution of a conditional branch and an indirect branch, respectively. Upon processing an exception, PC silo and redirect unit 48 may purge entries from return stack 22 which are subsequent to the exception-causing instruction. Additionally, PC silo and redirect unit 48 routes an indication of the exception-causing instruction to map unit 30, instruction queues 36, and load/store unit 42 so that these units may cancel instructions which are subsequent to the exception-causing instruction and recover speculative state accordingly.

In one embodiment, PC silo and redirect unit 48 assigns a sequence number (R#) to each instruction operation to identify the order of instruction operations outstanding within processor 10. PC silo and redirect unit 48 may assign R#s to each possible instruction operation with a line. If a line includes fewer than the maximum number of instruction operations, some of the assigned R#s will not be used for that line. However, PC silo and redirect unit 48 may be configured to assign the next set of R#s to the next line of instruction operations, and hence the assigned but not used R#s remain unused until the corresponding line of instruction operations is retired. In this fashion, a portion of the R#s assigned to a given line may be used to identify the line within processor 10. In one embodiment, a maximum of 8 ROPs may be allocated to a line. Accordingly, the first ROP within each line may be assigned an R# which is a multiple of 8. Unused R#s are accordingly automatically skipped.

The preceding discussion has described line predictor 12 predicting next addresses and providing instruction operation information for lines of instruction operations. This operation occurs as long as each fetch address hits in line predictor 12. Upon detecting a miss in line predictor 12, alignment unit 16 routes the corresponding instruction bytes from I-cache 14 to predictor miss decode unit 26. Predictor miss decode unit 26 decodes the instructions beginning at the offset specified by the missing fetch address and generates a line of instruction operation information and a next fetch address. Predictor miss decode unit 26 enforces any limits on a line of instruction operations as processor 10 is designed for (e.g. maximum number of instruction operations, maximum number of instructions, terminate on branch instructions, etc.). Upon completing decode of a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected. Furthermore, a hit in line predictor 12 may be detected and a miss in I-cache 14 may occur. The corresponding instruction bytes may be fetched through external interface unit 46 and stored in I-cache 14.

In one embodiment, line predictor 12 and I-cache 14 employ physical addressing. However, upon detecting an exception, PC silo and redirect unit 48 will be supplied a logical (or virtual) address. Accordingly, the redirect addresses are translated by ITB 50 for presentation to line predictor 12. Additionally, PC silo and redirect unit 48 maintains a virtual lookahead PC value for use in PC relative calculations such as relative branch target addresses. The virtual lookahead PC corresponding to each line is translated by ITB 50 to verify that the corresponding physical address matches the physical fetch address produced by line predictor 12. If a mismatch occurs, line predictor 12 is updated with the correct physical address and the correct instructions are fetched. PC silo and redirect unit 48 further handles exceptions related to fetching beyond protection boundaries, etc. PC silo and redirect unit 48 also maintains a retire PC value indicating the address of the most recently retired instructions.

Decode unit 24 is configured receive instruction operations from alignment unit 16 in a plurality of issue positions, as described above. Decode unit 24 decodes the instruction bytes aligned to each issue position in parallel (along with an indication of which instruction operation corresponding to the instruction bytes is to be generated in a particular issue position). Decode unit 24 identifies source and destination operands for each instruction operation and generates the instruction operation encoding used by execution cores 40A–40B. Decode unit 24 is also configured to fetch microcode routines from microcode unit 28 for instructions which are implemented in microcode.

According to one particular embodiment, the following instruction operations are supported by processor 10: integer, floating point add (including multimedia), floating point multiply (including multimedia), branch, load, store address generation, and store data. Each instruction operation may employ up to 2 source register operands and one destination register operand. According to one particular embodiment, a single destination register operand may be assigned to integer ROPs to store both the integer result and a condition code (or flags) update. The corresponding logical registers will both receive the corresponding PR# upon retirement of the integer operation. Certain instructions may generate two instruction operations of the same type to update two destination registers (e.g. POP, which updates the ESP and the specified destination register).

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Additionally, map unit 30 assigns a queue number (IQ#) to each instruction operation, identifying the location within instruction queues 36A–36B assigned to store the instruction operation. Map unit 30 additionally provides an indication of the dependencies for each instruction operation by providing queue numbers of the instructions which update each physical register number assigned to a source operand of the instruction operation. Map unit 30 updates map silo 32 with the physical register numbers and instruction to numbers assigned to each instruction operation (as well as the corresponding logical register numbers). Furthermore, map silo 32 may be configured to store a lookahead state corresponding to the logical registers prior to the line of instructions and an R# identifying the line of instructions with respect to the PC silo. Similar to the PC silo described above, map silo 32 may comprise a circular buffer of entries. Each entry may be configured to store the information corresponding one line of instruction operations.

Map unit 30 and map silo 32 are further configured to receive a retire indication from PC silo 48. Upon retiring a line of instruction operations, map silo 32 conveys the destination physical register numbers assigned to the line and corresponding logical register numbers to architectural renames block 34 for storage. Architectural renames block 34 stores a physical register number corresponding to each logical register, representing the committed register state for each logical register. The physical register numbers displaced from architectural renames block 34 upon update of the corresponding logical register with a new physical register number are returned to the free list of physical register numbers for allocation to subsequent instructions. In one embodiment, prior to returning a physical register number to the free list, the physical register numbers are compared to the remaining physical register numbers within architectural renames block 34. If a physical register number is still represented within architectural renames block 34 after being displaced, the physical register number is not added to the free list. Such an embodiment may be employed in cases in which the same physical register number is used to store more than one result of an instruction. For example, an embodiment employing the x86 instruction set architecture may provide physical registers large enough to store floating point operands. In this manner, any physical register may be used to store any type of operand. However, integer operands and condition code operands do not fully utilize the space within a given physical register. In such an embodiment, processor 10 may assign a single physical register to store both integer result and a condition code result of an instruction. A subsequent retirement of an instruction which overwrites the condition code result corresponding to the physical register may not update the same integer register, and hence the physical register may not be free upon committing a new condition code result. Similarly, a subsequent retirement of an instruction which updates the integer register corresponding to the physical register may not update the condition code register, and hence the physical register may not be free upon committing the new integer result.

Still further, map unit 30 and map silo 32 are configured to receive exception indications from PC silo 48. Lines of instruction operations subsequent to the line including the exception-causing instruction operation are marked invalid within map silo 32. The physical register numbers corresponding to the subsequent lines of instruction operations are freed upon selection of the corresponding lines for retirement (and architectural renames block 34 is not updated with the invalidated destination registers). Additionally, the lookahead register state maintained by map unit 30 is restored to the lookahead register state corresponding to the exception-causing instruction.

The line of instruction operations, source physical register numbers, source queue numbers, and destination physical register numbers are stored into instruction queues 36A–36B according to the queue numbers assigned by map unit 30. According to one embodiment, instruction queues 36A–36B are symmetrical and can store any instructions. Furthermore, dependencies for a particular instruction operation may occur with respect to other instruction operations which are stored in either instruction queue. Map unit 30 may, for example, store a line of instruction operations into one of instruction queues 36A–36B and store a following line of instruction operations into the other one of instruction queues 36A–36B. An instruction operation remains in instruction queue 36A–36B at least until the prior instruction operations upon which the instruction operation is dependent are executed and have updated register files 38A–38B (and the instruction operation is scheduled for execution). In one embodiment, instruction operations remain in instruction queues 36A–36B until retired.

Instruction queues 36A–36B, upon scheduling a particular instruction operation for execution, determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Instruction queues 36A–36B await the specified number of clock cycles until the update occurs, and then indicate that instruction operations dependent upon that particular instruction operation may be scheduled. Each instruction queue 36A–36B maintains the countdowns for instruction operations within that instruction queue, and internally allow dependent instruction operations to be scheduled upon expiration of the countdown. Additionally, the instruction queue provides indications to the other instruction queue upon expiration of the countdown. Subsequently, the other instruction queue may schedule dependent instruction operations. This delayed transmission of instruction operation completions to the other instruction queue allows register files 38A–38B to propagate results provided by one of execution cores 40A–40B to the other register file. Each of register files 38A–38B implements the set of physical registers employed by processor 10, and is updated by one of execution cores 40A–40B. The updates are then propagated to the other register file. It is noted that instruction queues 36A–36B may schedule an instruction once its dependencies have been satisfied (i.e. out of order with respect to its order within the queue).

Instruction operations scheduled from instruction queue 36A read source operands according to the source physical register numbers from register file 38A and are conveyed to execution core 40A for execution. Execution core 40A executes the instruction operation and updates the physical register assigned to the destination within register file 38A. Some instruction operations do not have destination registers, and execution core 40A does not update a destination physical register in this case. Additionally, execution core 40A reports the R# of the instruction operation and exception information regarding the instruction operation (if any) to PC silo and redirect unit 48. Instruction queue 36B, register file 38B, and execution core 40B may operate in a similar fashion.

In one embodiment, execution core 40A and execution core 40B are symmetrical. Each execution core 40 may include, for example, a floating point add unit, a floating point multiply unit, two integer, units a branch unit, a load address generation unit, a store address generation unit, and a store data unit. Other configurations of execution units are possible.

Among the instruction operations which do not have destination registers are store address generations, store data operations, and branch operations. The store address/store data operations provide results to load/store unit 42. Load/store unit 42 provides an interface to D-cache 44 for performing memory data operations. Execution cores 40A–40B execute load ROPs and store address ROPs to generate load and store addresses, respectively, based upon the address operands of the instructions. More particularly, load addresses and store addresses may be presented to D-cache 44 upon generation thereof by execution cores 40A–40B (directly via connections between execution cores 40A–40B and D-Cache 44). Load addresses which hit D-cache 44 result in data being routed from D-cache 44 to register files 38. On the other hand, store addresses which hit are allocated a store queue entry. Subsequently, the store data is provided by a store data instruction operation (which is used to route the store data from register files 38A–38B to load/store unit 42). Upon retirement of the store instruction, the data is stored into D-cache 44. Additionally, load/store unit 42 may include a load/store buffer for storing load/store addresses which miss D-cache 44 for subsequent cache fills (via external interface 46) and re-attempting the missing load/store operations. Load/store unit 42 is further configured to handle load/store memory dependencies.

Figure 2:
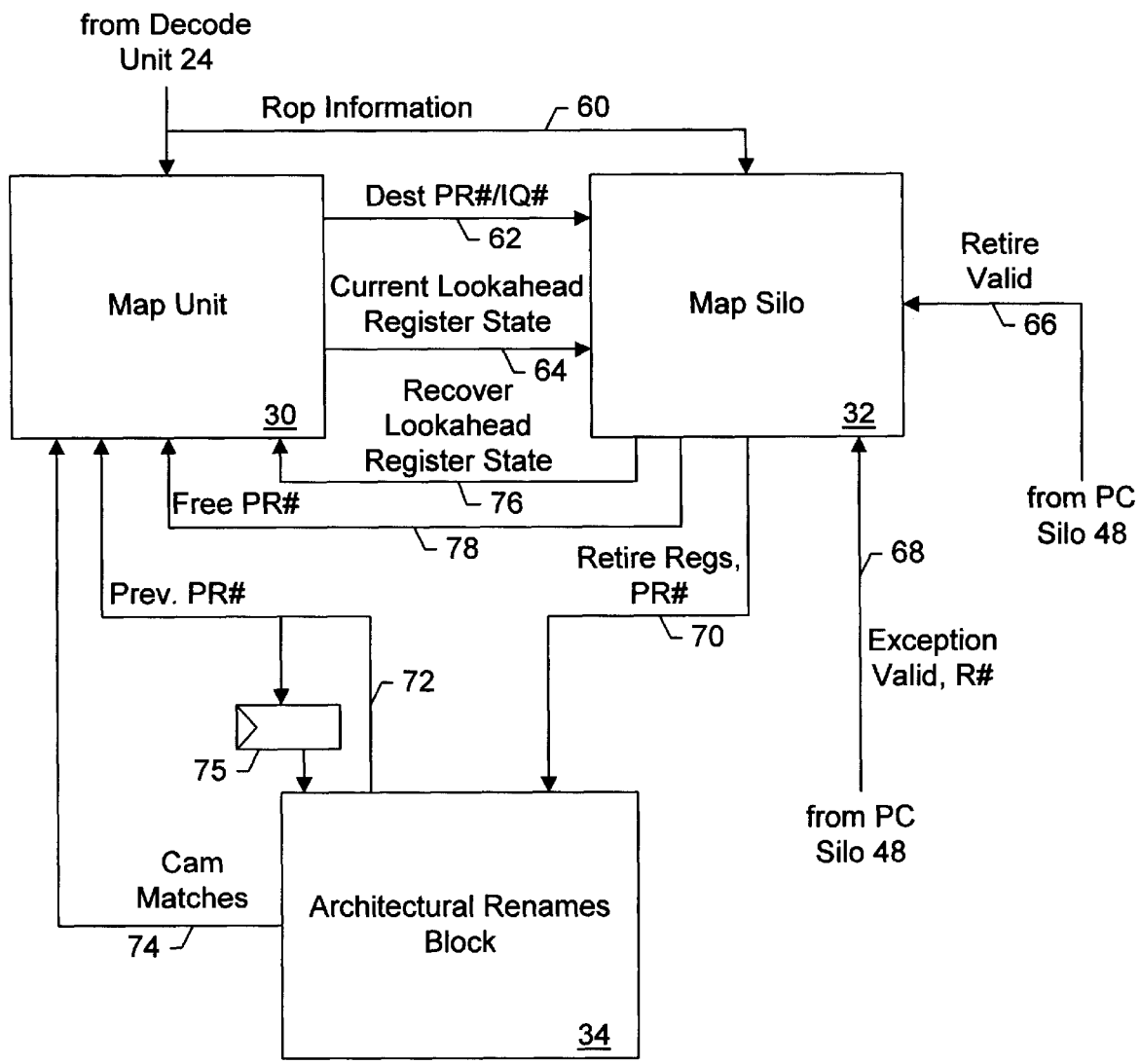
FIG. 2 is a block diagram of a map unit, a map silo, and an architectural renames block shown in FIG. 1 highlighting interconnection therebetween according to one embodiment of the processor shown in FIG. 1.

Turning now to FIG. 2, a block diagram of one embodiment of map unit 30, map silo 32, and architectural renames block 34 is shown to highlight interconnection therebetween according to one embodiment of processor 10. Other embodiments are possible and contemplated employing additional, substitute, or less interconnect, as desired.

Figure 9:
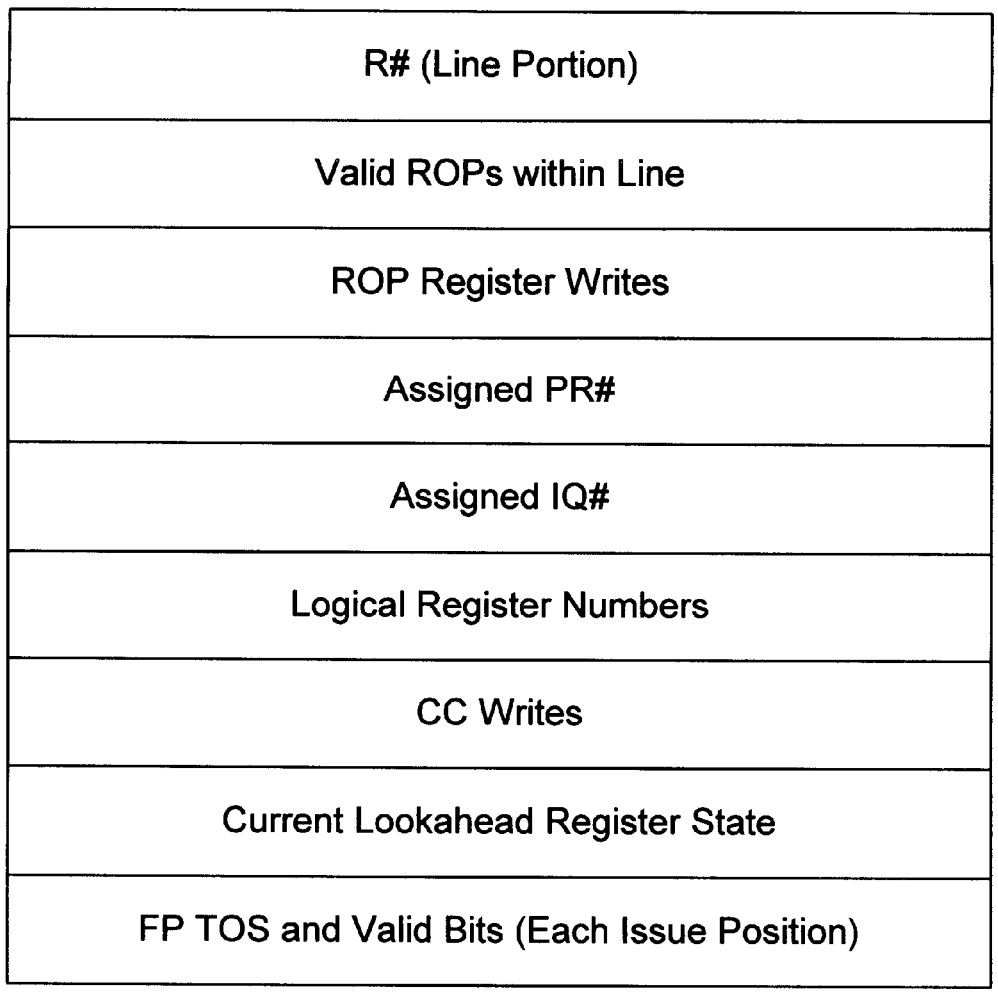
FIG. 9 is a table illustrating information stored in one embodiment of a map silo illustrated in FIGS. 1 and 2.

Decode unit 24 is connected to an ROP information bus 60 which is further connected to both map unit 30 and map silo 32. Information regarding a line of instruction operations (or line of ROPs) is provided by decode unit 24 upon ROP information bus 60. For each ROP within the line, decode unit 24 provides at least the following: a valid indication, an indication of whether the ROP writes a destination register, an R#, a logical destination register number, and logical source register numbers (up to two). Map unit 30 assigns a destination IQ# to each ROP, and a destination PR# to each ROP which writes a destination register. Map unit 30 provides the assigned PR# and IQ# to map silo 32 upon a destination PR#/IQ# bus 62. Additionally, map unit 30 provides a current lookahead register state to map silo 32 upon a current lookahead register state bus 64. Generally, the term "lookahead register state" refers to identifying the state of the logical registers (i.e. the values stored therein) at a particular point in execution of a program sequence (i.e. subsequent to executing each instruction prior to the particular point in the program sequence and prior to executing each instruction subsequent to the particular point in the program sequence). The current lookahead register state identifies the set of physical registers which correspond to the logical registers prior to the line of ROPs being processed by map unit 30. In other words, the current lookahead register state stores the physical register number corresponding to each logical register. Additionally, in the present embodiment, the current lookahead register state includes the IQ# of the instruction which updates the identified physical register and a valid bit indicating whether or not the IQ# is still valid (i.e. the instruction has not yet been retired). Map silo 32 allocates an entry for the line of ROPs and stores the current lookahead register state and assigned PR#s and IQ#s provided by map unit 30. Additionally, map silo 30 may capture which ROPs are valid, which ROPs update logical registers, and which logical registers are updated by those ROPs from ROP information bus 60. An exemplary map silo entry is illustrated below (FIG. 9).

Generally, a "silo" as referred to herein is a structure for storing information corresponding to an instruction, an instruction operation, or a line of instruction operations. The silo keeps the information in program order, and the information logically moves from the top of the silo (or the tail) to the bottom (or the head) of the silo as instructions are retired in program order (in the absence of exception conditions). As used herein, an instruction is retired when the result of the instruction is committed to architectural state (e.g. by allowing the update of architectural renames block 34 with the physical register number assigned to the destination of the instruction or by allowing the update of D-cache 44 with store data corresponding to the instruction).

Map silo 32 is connected to receive a retire valid signal upon a retire valid line 66 and a exception valid indication and R# upon an exception information bus 68. Retire valid line 66 and exception information bus 68 are connected to PC silo 48. In response an asserted retire valid signal, map silo 32 provides retired register information on a retire register/PR# bus 70 to architectural renames block 34 from the entry at the head of the silo. More particularly, retire register/PR# bus 70 may convey a logical register number to be updated and the corresponding physical register number. In the present embodiment, retirement of ROPs occurs concurrently for a full line (i.e. PC silo 48 signals retirement once each of the ROPs in the line at the head of PC silo 48 and map silo 32 have successfully executed). Accordingly, a signal to retire the oldest line may be used in the present embodiment. Other embodiments may provide for partial retirement or may organize storage via individual instruction operations, in which case retirement may occur by instruction operation, etc.

Architectural renames block 34, prior to updating entries corresponding to the logical registers specified on retire register/PR# bus 70, reads the current physical register numbers corresponding to those logical registers. In other words, the physical register numbers being displaced from architectural renames block 34 (the "previous physical register numbers") are popped out of architectural renames block 34. Architectural renames block 34 provides the previous PR#s on a previous PR# bus 72 which is connected to map unit 30 and updates the specified logical register entries with the PR# provided on retire register/PR# bus 70.

Generally, the previous PR# are eligible to be added to the free list of PR#s (and for assignment to the destination register of a subsequent ROP). However, in the present embodiment, processor 10 employs a physical register sharing technique to improve the efficiency of physical register usage. For example, a physical register may be assigned to store both an integer value and a condition code value (or flags value). A portion of the physical register storage stores the integer value and another portion stores the condition code value. Accordingly, when a previous PR# is popped, for example, upon update of the integer register to which the PR# was assigned, the PR# may still represent the condition codes stored therein (and vice-versa). Architectural renames block 34 compares the previous PR# to the updated architectural state to determine which registers are actually eligible to be freed (represented in FIG. 2 by register 75 capturing the PR#s from previous PR# bus 72 and returning the captured numbers to architectural renames block 34, although other embodiments may accomplish the update and compare in one clock cycle). For example, architectural renames block 34 may employ a content addressable memory (CAM) for storing the PR#s corresponding to the logical registers. Architectural renames block 34 may convey a cam match signal upon a cam matches bus 74 corresponding to each PR# conveyed upon previous PR# bus 72. Map unit 30 may free the registers specified on previous PR# bus 72 if the corresponding cam match signal is not asserted. Advantageously, physical register usage may be more efficient and yet physical registers may be accurately freed. It is noted that, in other contemplated embodiments, separate physical registers may be assigned to each logical register updated in response to an instruction operation.

It is noted that, in the event that a previous PR# is not freed upon being popped from architectural renames block 34, a subsequent retirement of an instruction which updates the logical register which is still represented by the previous PR# may lead to the freeing of the previous PR#. Upon the subsequent retirement, a cam match may not be detected.

As used herein, a physical register is "free" if it is available for assignment to the destination operand of an instruction being processed by the renaming hardware. In the present embodiment, a physical register is freed upon retirement of a subsequent instruction updating the logical register to which the physical register is assigned. Other embodiments may free the register in alternative fashions.

It is noted that one or more instruction operations within a line may update the same logical register. Accordingly, one of map silo 32 or architectural renames block 34 includes logic to scan the logical registers being retired to identify the oldest update to each logical register (i.e. the last update, in program order) and stores the physical register number corresponding to that oldest update in architectural renames block 34. The newer updates may be freed similar to the above discussion (i.e. cammed and freed if no match occurs).

Map silo 32 may receive an exception indication from PC silo 48 as well. PC silo 48 may assert the exception valid signal and provide an R# of the instruction operation experiencing the exception to map silo 34 via exception information bus 68. Map silo 32 selects the silo entry corresponding to the line of ROPs including the instruction operation experiencing the exception (using the portion of the R# which is constant for each ROP in the line). Map silo 32 provides the current lookahead register state stored in the selected entry to map unit 30 upon recover lookahead register state bus 76. Map unit 30 restores the lookahead register state to the recovered state. Additionally, map silo 32 provides the logical register numbers, PR#s, and IQ#s of ROPs within the line but prior to the ROP experiencing the exception. Map unit 30 updates the restored lookahead state with the provided PR#s and IQ#s. Advantageously, the lookahead state is rapidly recovered. Instructions fetched in response to the exception condition may be renamed upon reaching map unit 30 due to the rapid recovery of the renames.

Additionally, in response to an exception, physical registers assigned to ROPs subsequent to the ROP experiencing the exception are freed. Map silo 32 conveys the PR#s to be freed upon a free PR# bus 78 to map unit 30. In one embodiment, map silo 32 may be configured to provide the PR#s to be freed at a rate of one line per clock cycle. Additionally, since the ROPs to which the physical registers were assigned were not retired, the physical registers need not be conveyed to architectural renames block 34 for camming.

Figure 3:
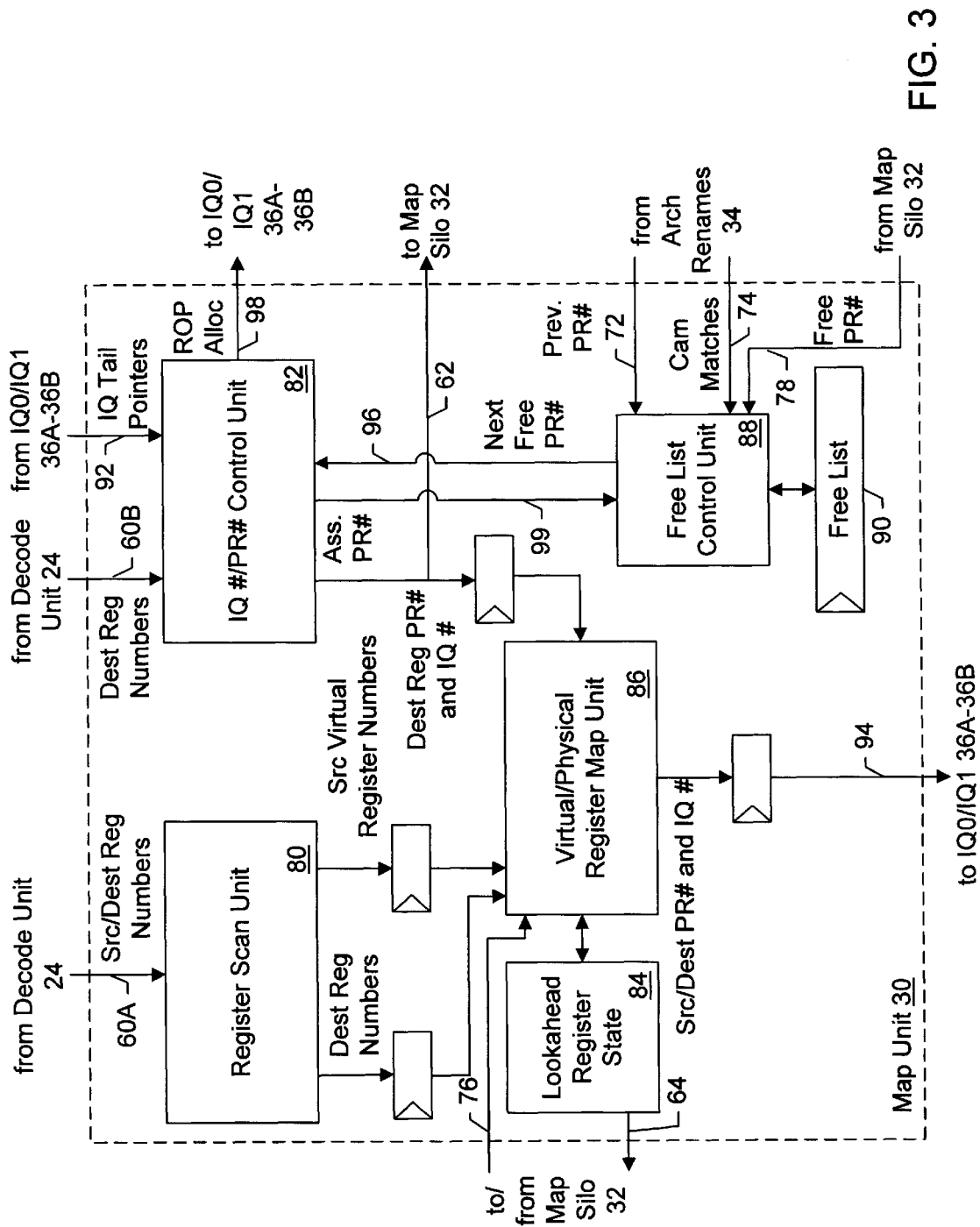
FIG. 3 is a block diagram of one embodiment of a map unit shown in FIGS. 1 and 2.

Turning now to FIG. 3, a block diagram of one embodiment of map unit 30 is shown. Other embodiments are possible and contemplated. In the embodiment of FIG. 3, map unit 30 includes a register scan unit 80, an IQ#/PR# control unit 82, a lookahead register state 84, a virtual/physical register map unit 86, a free list control unit 88, and a free list register 90. Register scan unit 80 is connected to receive source and destination register numbers (and a valid indication for each) from decode unit 24 upon bus 60A (a portion of ROP information bus 60 shown in FIG. 2). Register scan unit 80 is configured to pass the destination register numbers and source virtual register numbers to virtual/physical register map unit 86. IQ#/PR# control unit 82 is connected to a bus 60B (a portion of ROP information bus 60 shown in FIG. 2) to receive destination register numbers and valid indications corresponding to the destination register numbers. Instruction queues 36A–36B provide tail pointers upon tail pointers bus 92, indicating which entry in each queue is currently the tail of the queue. Additionally, IQ#/PR# control unit 82 is connected to destination PR#/IQ# bus 62. Virtual/physical register map unit 86 is connected to recover lookahead register state bus 76 and to lookahead register state 84, which is further connected to current lookahead register state bus 64. Still further, virtual/physical register map unit 86 is connected to provide source PR#s, source IQ#s, destination PR#s, and an IQ# for each ROP within the line upon a source/destination PR# and IQ# bus 94 to instruction queues 36A–36B. Free list control unit 88 is connected to IQ#/PR# control unit 82 via a next free PR# bus 96 and an assigned PR# bus 99, and is connected to free list register 90. Furthermore, free list control unit 88 is connected to previous PR# bus 72, cam matches bus 74, and free PR# bus 78.

In the embodiment of FIG. 3, map unit 30 performs register renaming using a two stage pipeline design. In the first stage, register scan unit 80 assigns virtual register numbers to each source register. In parallel, IQ#/PR# control unit 82 assigns IQ#s (based upon the tail pointers provided by instruction queues 36A–36B) to each ROP and PR#s to the ROPs which have a destination register. In the second stage, virtual/physical register map unit 86 maps the virtual register numbers to physical register numbers (based upon the current lookahead state and the assigned PR#s) and routes the physical register numbers assigned by IQ#/PR# control unit 82 to the issue position of the corresponding ROP.

The virtual register numbers assigned by register scan unit 80 identify a source for the physical register number. For example, in the present embodiment, physical register numbers corresponding to source registers may be drawn from either lookahead register state 84 (which reflects updates corresponding to the lines of ROPs previously processed by map unit 30) or from a previous issue position within the line of ROPs (if the destination operand of the previous ROP is the same as the source operand . . . i.e. an intraline dependency exists). In other words, the physical register number corresponding to a source register number is the physical register number maintained by lookahead register state 84 unless an intraline dependency is detected. Register scan unit 80 effectively performs intraline dependency checking. Other embodiments may provide for other sources of source operands, as desired.

Figure 8:
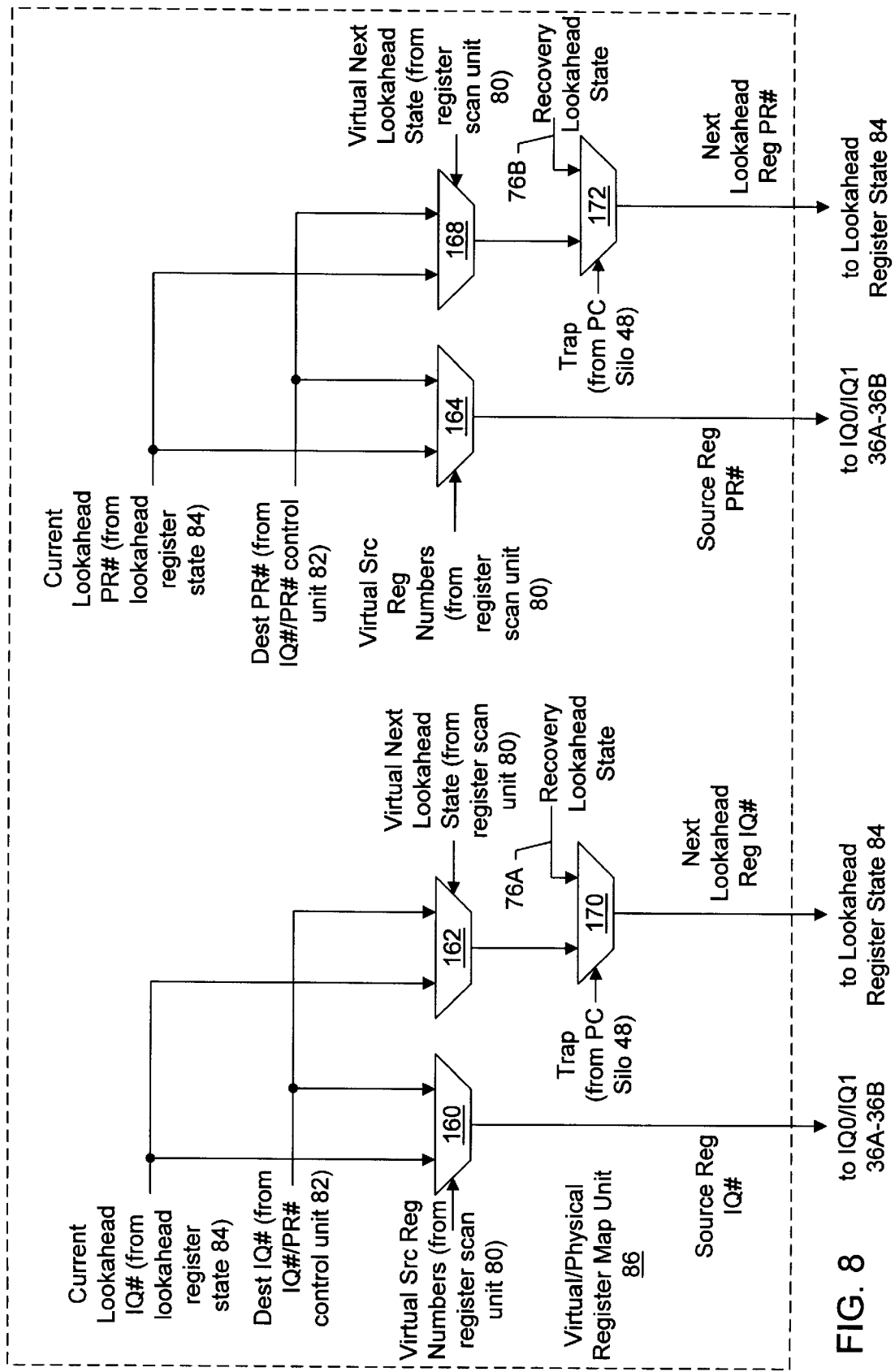
FIG. 8 is a block diagram of one embodiment of a virtual/physical register map unit shown in FIG. 3.

By separating intraline dependency checking/destination physical register assignment from physical register number mapping into pipeline stages, each stage may be operated at a higher frequency. Accordingly, the embodiment of map unit 30 shown in FIG. 3 may be operable at a higher frequency than other embodiments which perform intraline dependency checking and destination physical register assignment in parallel with determining source physical register numbers. Using the virtual register numbers allows the separation of the functions and, as illustrated in FIG. 8 below, allows for a relatively simple and efficient mapping of source physical register numbers.

IQ#/PR# control unit 82 assigns instruction queue numbers beginning with the tail pointer of one of instruction queues 36A–36B. In other words, the first ROP within the line receives the tail pointer of the selected instruction queue as an IQ#, and other ROPs receive IQ#s in increasing order from the tail pointer. Control unit 82 assigns each of the ROPs in a line to the same instruction queue 36A–36B, and allocates the next line of ROPs to the other instruction queue 36A–36B. Control unit 82 conveys an indication of the number of ROPs allocated to the instruction queue 36A–36B via ROP allocated bus 98. The receiving instruction queue may thereby update its tail pointer to reflect the allocation of the ROPs to that queue.

Control unit 82 receives a set of free PR#s from free list control unit 88. The set of free PR#s are assigned to the destination registers within the line of instruction operations. In one embodiment, processor 10 limits the number of logical register updates within a line to four (i.e. if predictor miss decode unit 26 encounters a fifth logical register update, the line is terminated at the previous instruction). Hence, free list control unit 88 selects four PR#s from free list 90 and conveys the selected registers to control unit 82 upon next free PR# bus 96. Control unit 82 responds with which PR#s were actually assigned via assigned PR# bus 99, and free list control unit 88 deletes the assigned physical registers from the free list. Other embodiments may employ different limits to the number of updates within a line, including no limit (i.e. each ROP may update).

Free list control unit 88 is configured to manage the freeing of physical registers and to select registers for assignment to subsequent instructions. Free list register 90 may store, for example, a bit corresponding to each physical register. If the bit is set, the corresponding register is free. If the bit is clear, the corresponding register is currently assigned (i.e. not free). Free list control unit 88 scans the free list to select registers for conveyance to control unit 82. For example, free list control unit 88 may scan for the first two free registers from each end of free list register 90 to allow for rapid selection of the four registers provided in the present embodiment. These scans may be performed as two pick one operations from each end (one performed before the other and removing the assigned physical register from the free list).

Free list control unit 88 receives the previous physical register numbers popped from architectural renames block 34 via previous PR# bus 72. Subsequently, the cam match signals corresponding to each previous physical register number are received upon cam matches bus 74. Each previous PR# for which the corresponding cam match signal is deasserted is added to the free list by free list control unit 88. Additionally, physical register numbers received upon free PR# bus 78 are unconditionally added to the free list.

Lookahead register state 84 stores the lookahead register state prior to updates corresponding to the line of ROPs presented to virtual/physical register map unit 86. More particularly, lookahead register state 84 stores a physical register number corresponding to each logical register and (in the present embodiment) an instruction queue number corresponding to the ROP having the physical register number assigned as a destination register. Each clock cycle, lookahead register state 84 conveys the current lookahead register state to map silo 32 upon current lookahead register state bus 64. Virtual/physical register map unit 86 supplies the PR# and IQ# of the corresponding logical register as indicated by lookahead register state 84 for each source register having a virtual register number indicating that the source of the PR# is lookahead register state 84. Source registers for which the virtual register number indicates a prior issue position are supplied with the corresponding PR# and IQ# assigned by control unit 82. Furthermore, virtual/physical register map unit 86 updates the lookahead register state 84 according to the logical destination registers specified by the line of ROPs and the destination PR#s/IQ#s assigned by control unit 82.

Virtual/physical register map unit 86 is further configured to receive a recovery lookahead register state provided by map silo 32 upon recovery lookahead register state bus 76 in response to an exception condition (as described above). Virtual/physical register map unit 86 may override the next lookahead register state generated according to inputs from register scan unit 80 and IQ#/PR# control unit 82 with the recovery lookahead state provided by map silo 32.

It is noted that, in the present embodiment, IQ#s are routed for each source operand to indicate which instruction queue entries the corresponding ROP is dependent upon. Instruction queues 36A–36B await completion of the ROPs in the corresponding instruction queue entries before scheduling the dependent ROP for execution.

Figures 4, 5:
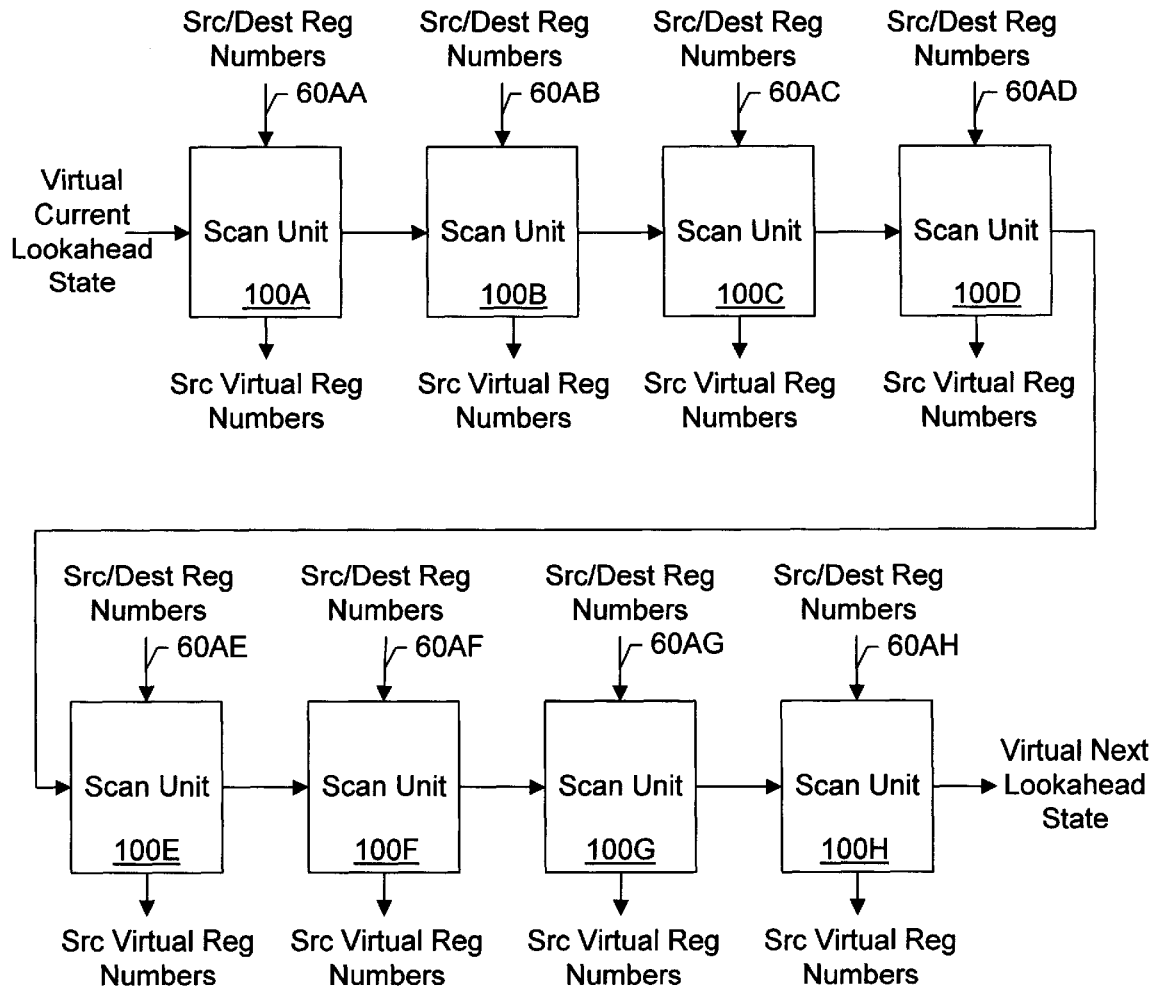
FIG. 4 is a block diagram of one embodiment of a register scan unit shown in FIG. 3.
FIG. 5 is a table illustrating one encoding which may be used for virtual register numbers.

Turning now to FIG. 4, a block diagram illustrating one embodiment of register scan unit 80 is shown. Other embodiments are possible and contemplated. In the embodiment of FIG. 4, register scan unit 80 includes a scan unit corresponding to each issue position within the line of ROPs. For example, the present embodiment includes eight scan units 100A–100H corresponding to eight issue positions (although more or fewer may be implemented). Scan units 100A–100H are connected into a serial chain for passing virtual lookahead register state, and in parallel to receive source and destination register numbers.

Each scan unit 100A–100H is connected to a portion of ROP bus 60A shown in FIG. 3. More particularly, each scan unit 100A–100H is connected to receive the source and destination register numbers of the ROP in the corresponding issue position. Accordingly, a bus 60AA is connected to scan unit 100A, providing the source and destination register numbers for issue position zero (i.e. the first ROP in program order within the line of ROPs). Similarly, bus 60AB is connected to scan unit 100B, providing the source and destination register numbers for issue position one. Other buses 60AC–60AH provide source and destination register numbers corresponding to the remaining issue positions in order, as shown. Each scan unit 100A–100H is configured to provide a source virtual register number for each source register, which is subsequently passed to virtual/physical register map unit 86.

Scan unit 100A is coupled to receive a virtual current lookahead register state. The virtual current lookahead register state includes a virtual register number corresponding to each logical register. The virtual register numbers within the virtual current lookahead state indicate that the source of the PR# (and IQ#) is lookahead register state 84. In one embodiment employing the x86 instruction set architecture, for example, lookahead register state 84 includes 8 registers corresponding to the architected integer registers, 3 registers corresponding to groups of condition code bits (groupings are selected according to which ones are updated by various instructions, e.g. the O bit may be one group, the C bit another group, and the Z, A, P, and S bits the third group), 8 registers corresponding to the architected floating point/ MMX registers, one register corresponding to the floating point condition code register, and 8 registers corresponding to temporary microcode registers.

Scan unit 100A assigns source virtual register numbers from the virtual current lookahead register state based upon the source register numbers. Additionally, if the ROP in issue position zero updates a destination register, scan unit 100A updates the virtual current lookahead state by inserting a new virtual register number for the corresponding logical destination register. The new virtual register number indicates that the source of the PR# and IQ# for the corresponding logical register is issue position zero. An updated lookahead register state with the new virtual register number inserted in place of the original virtual register number is passed to scan unit 100B.

Scan unit 100B accepts the updated lookahead register state from scan unit 100A and assigns virtual register numbers from the updated lookahead register state to the source register numbers. Furthermore, scan unit 100B inserts a new virtual register number indicating issue position one into the updated lookahead register state provided by scan unit 100A if the ROP in issue position one updates a logical register. Scan units 100C–100H similarly assign virtual register numbers for the source registers of ROPs in issue positions 3–8, respectively, responsive to an updated lookahead register state provided by the preceding scan units, and updates the updated lookahead register state according to the destination register number, if any.

Accordingly, if a prior ROP within the line updates a logical register specified by a source register number of an ROP, a virtual register number indicating the prior issue position is assigned. Otherwise, a virtual register number indicating the current lookahead register state for the corresponding logical register is assigned. In other words, intraline dependencies and dependencies upon previous lines of instructions (through the current lookahead register state) are indicated by the virtual register numbers.

The updated lookahead register state provided by scan unit 100H is the virtual next lookahead register state, which is conveyed to virtual/physical register map unit 86 along with the source virtual register numbers provided by each of the scan units 100A–100H and the destination register numbers. Virtual/physical register map unit 86 may then generate the next lookahead register state corresponding to the line of ROPs, in order to update lookahead register state 84 for the subsequent line of ROPs.

It is noted that, in one embodiment, each scan unit 100A–100F includes an integer/temporary scan circuit handling the integer, temporary, and condition code registers and a floating point scan circuit handling the floating point registers and floating point condition code register. Accordingly, an indication of whether each source and destination register is a floating point or integer register is routed with the register number and used to determine which virtual register number to assign to the register or to replace with a new virtual register number.

Turning next to FIG. 5, a table 102 is shown illustrating an exemplary encoding of virtual register numbers. Other encodings are possible and contemplated. Particularly, for example, the logical state of the most significant bit (MSB) shown in table 102 may be inverted from that shown in the table. Still other encodings are possible as well.

Table 102 illustrates a virtual register number encoding in which the MSB determines whether the source for corresponding PR#/IQ# is the current lookahead state maintained by lookahead register state 84 or the destination PR#/IQ# assigned to a prior issue position within the line. For example, if the MSB is clear, then the virtual register number is indicating the source is the current lookahead state and the least significant bits (LSBs) of the virtual register number are the logical register number within the current lookahead state. If the MSB is set, then the virtual register number is indicating that the source is a prior issue position. The LSBs in this case are the prior issue position number.

In an embodiment employing the encodings shown in table 102, the virtual current lookahead state provided to scan unit 100A comprises encodings with the MSB clear and the corresponding logical register number provided in the LSBs. New virtual register numbers inserted into the updated lookahead register state by scan units 100A–100H comprise encodings with the MSB set and the issue position number corresponding to the inserting scan unit provided in the LSBs.

Figure 6:
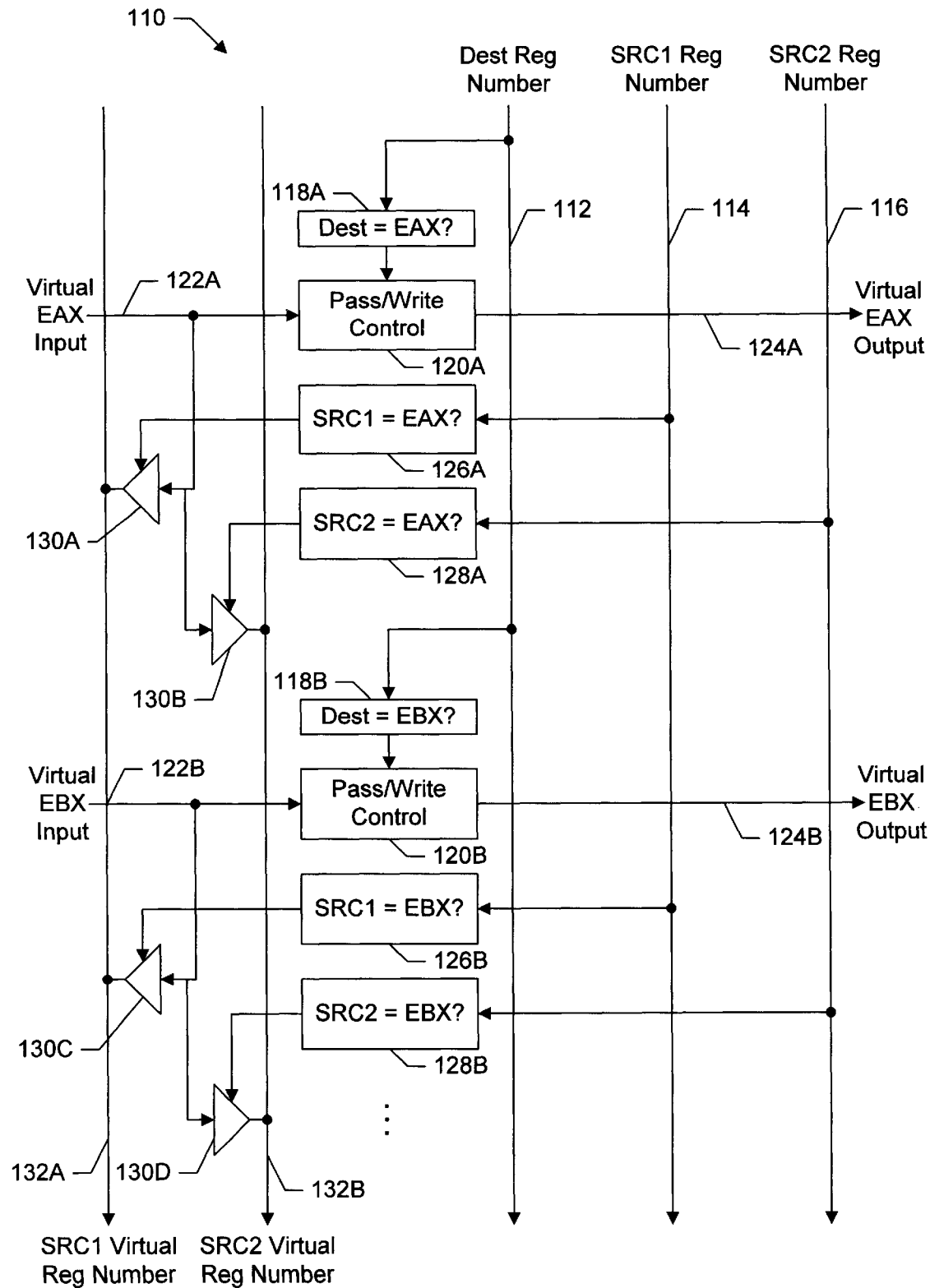
FIG. 6 is a block diagram of a portion of one embodiment of a scan unit shown in FIG. 4.

Turning next to FIG. 6, a portion of one embodiment of an integer/temporary scan circuit 110 is shown which may be employed within one embodiment of each of scan units 100A–100H. Other embodiments are possible and contemplated. In the embodiment of FIG. 6, the destination register number of the corresponding ROP is conveyed upon a destination bus 112, the first source (SRC1) register number of the corresponding ROP is conveyed upon a SRC1 bus 114, and the second source (SRC2) register number of the corresponding ROP is conveyed upon a SRC2 bus 116. Buses 112, 114, and 116 comprise a portion of bus 60A (e.g., if integer/temporary scan circuit 110 is a portion of scan unit 100A, buses 112, 114, and 116 are portions of bus 60AA). Destination bus 112 is connected to a plurality of destination identifier units (e.g. units 118A and 118B shown in FIG. 6). Each destination identifier unit 118A–118B is connected to a pass/write control unit (e.g. pass/write control units 120A and 120B connected to destination identifier units 118A and 118B, respectively). Each pass control unit 120A–120B is further connected to a virtual register input provided by a preceding scan unit 100A–100H and to a virtual register output to a succeeding scan unit 100A–100H (e.g. pass/write control unit 120A is connected to a virtual EAX input bus 122A and a virtual EAX output bus 124A and pass/write control unit 120B is connected to a virtual EBX input bus 122B and a virtual EBX output bus 124B). Additionally, SRC1 bus 114 is connected to a plurality of SRC1 identifier units (e.g. SRC1 identifier units 126A and 126B shown in FIG. 6). SRC2 bus 116 is similarly connected to a plurality of SRC2 identifier units (e.g. SRC2 identifier units 128A and 128B shown in FIG. 6). Each SRC1/SRC2 identifier unit 126A–126B or 128A–128B is connected to an enable control of a corresponding switch 130A–130D as shown in FIG. 6. Switches 130A–130B have inputs connected to virtual EAX input bus 122A, while switches 130C–130D have inputs connected to virtual EBX input bus 122B. Switches 130A and 130C have outputs connected to a SRC1 virtual register bus 132A, while switches 130B and 130D have outputs connected to a SRC2 virtual register bus 132B.

Generally, integer/temporary scan circuit 110 assigns the virtual register numbers for integer/temporary source registers of the ROP in the corresponding issue position and inserts new virtual register numbers for an integer destination register in the corresponding issue position. Each set of a destination identifier unit, pass/write control unit, SRC1 identifier unit, and SRC2 identifier unit corresponds to one of the logical integer, temporary, or condition code registers. For example, destination identifier unit 118A, pass/write control unit 120A, SRC1 identifier unit 126A, and SRC2 identifier unit 128A corresponds to the EAX register. Similarly, destination identifier unit 118B, pass/write control unit 120B, SRC1 identifier unit 126B, and SRC2 identifier unit 128B corresponds to the EBX register. Other sets of destination identifier units, pass/write control units, SRC1 identifier units, and SRC2 identifier units (not shown) correspond to other ones of the logical integer, temporary, or condition code registers. The succeeding discussion will describe the EAX register hardware. The EBX register hardware operates similarly with respect to the EBX register, and other similar hardware (not shown) operates similarly with respect to remaining registers.

Destination identifier unit 118A determines if the destination register number on destination register bus 112 selects the EAX register. Accordingly, destination identifier unit 118A decodes the destination register number to determine if EAX is selected, and the decode is qualified with a valid signal indicating that the destination register number is valid and an integer signal indicating that the destination register number is an integer/temporary/condition code register (i.e. not a floating point register). If the destination register is the EAX register, destination identifier unit 118A signals pass/write control unit 120A to insert the virtual register number corresponding to the issue position in which integer/temporary scan circuit 110 is employed upon virtual EAX output bus 124A. Otherwise, destination identifier unit 118A signals pass/write control unit 120A to pass the virtual register number provided upon virtual EAX input bus 122A to virtual EAX output bus 124A.

Similarly, SRC1 identifier unit 126A determines if the SRC1 register number on SRC1 register bus 114 selects the EAX register by decoding the SRC1 register number to determine if EAX is selected, and qualifying the decode with a valid signal indicating that the SRC1 register number is valid and an integer signal indicating that the SRC1 register number is an integer/temporary/condition code register. If EAX is selected as SRC1, SRC1 identifier unit 126A activates switch 130A to drive the virtual register number provided upon virtual EAX input bus 122A onto SRC1 virtual register bus 132A. SRC2 identifier unit 128A is similar to SRC 1 identifier unit 126A but operates upon the SRC2 register number provided upon SRC2 register bus 116 and controls switch 130B to accordingly drive or not drive SRC2 virtual register bus 132B.

In this fashion, an updated lookahead state may be passed to the next scan unit (via virtual output buses such as 124A–124B), and source virtual register numbers may be assigned (via buses such as SRC1 virtual register bus 132A and SRC2 register number bus 132B). It is noted that integer/temporary scan circuit 110 may be modified to handle register to register move operations by routing each of the virtual integer/temporary inputs to pass/write control unit 120A (and other pass/write control units). Additional signalling may be provided to indicate that the ROP in the current issue position is a register-register move. In response to the SRC1 register number and the move signal, the virtual integer/temporary input corresponding to the SRC1 register number is routed to the virtual integer/temporary output corresponding to the destination register. Additionally, the ROP in the corresponding issue position is inhibited from passing to instruction queues 36A–36B (e.g. its valid bit is reset), since the move is accomplished by routing the source virtual register number as the destination virtual register number. In such an embodiment, the camming of retired physical registers prior to freeing them may prevent the inadvertent early freeing of the destination PR#.

Figure 7:
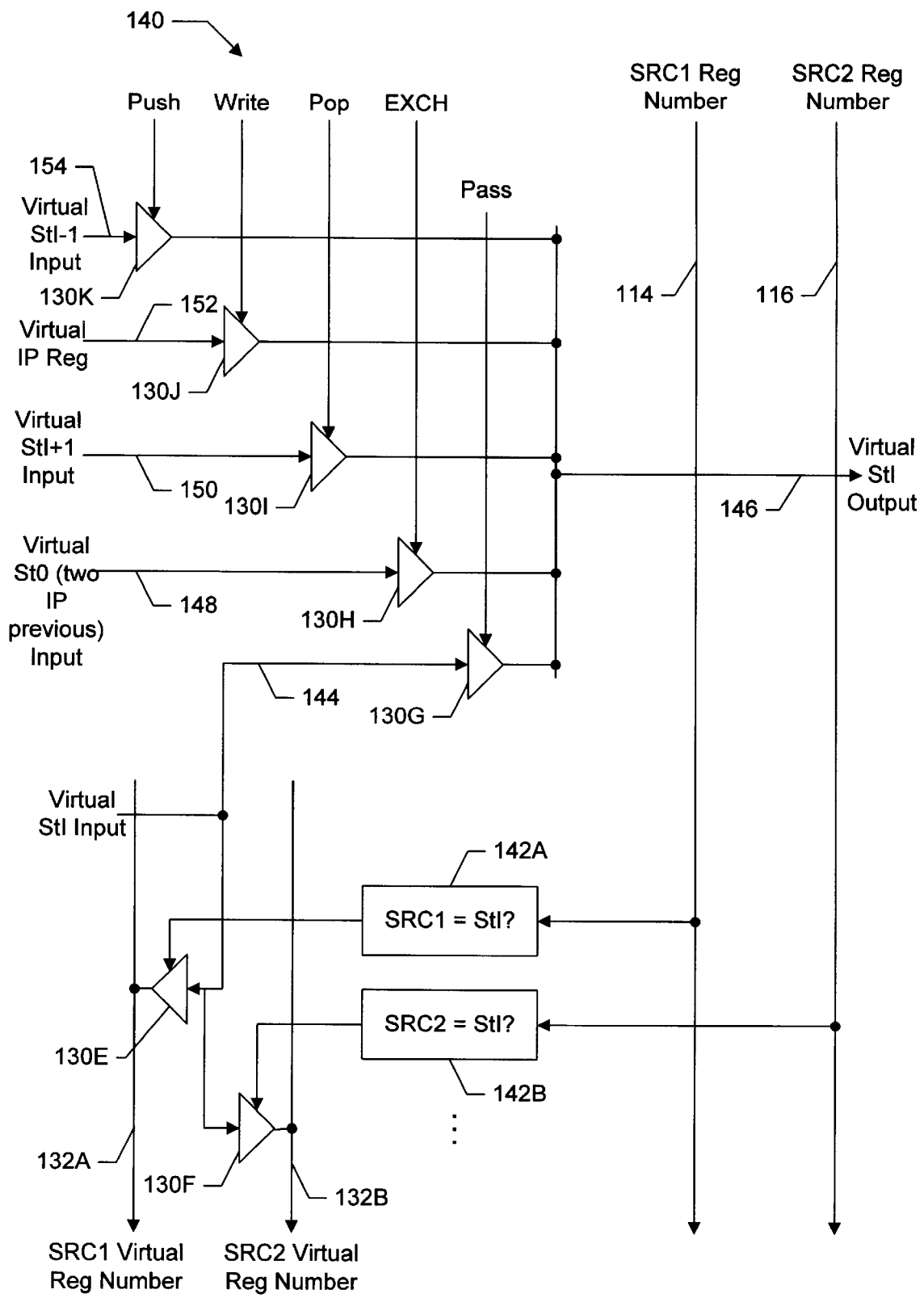
FIG. 7 is a block diagram of another portion of one embodiment of a scan unit shown in FIG. 4.

Turning now to FIG. 7, a portion of one embodiment of a floating point scan circuit 140 is shown which may be employed within one embodiment of each of scan units 100A–100H. Other embodiments are possible and contemplated. Scan circuit 140 receives SRC1 register bus 114 and SRC2 register bus 116, similar to integer/temporary scan circuit 110, and may drive source virtual register numbers upon SRC1 virtual register bus 132A and SRC2 virtual register bus 132B. The portion shown in FIG. 7 receives the virtual stI input (i.e. one of st0 through st7 registers as defined in the x86 instruction set architecture, hence 0<I<7) and provides the virtual stI output for the issue position in which circuit 140 is employed (the "present issue position"). A SRC1 identifier unit 142A connected to SRC1 register bus 114 determines if the SRC1 register number is selecting the stI register (i.e. the register number is stI, the register is a floating point register, and the SRC1 register is valid). If the SRC1 register number is selecting the stI register, SRC1 identifier unit 142A controls switch 130E to drive the virtual register number provided upon a virtual stI input bus 144 onto SRC1 virtual register bus 132A. Similarly, a SRC2 identifier unit 142B connected to SRC2 register bus 116 determines if the SRC2 register number is selecting the stI register and selectively controls a switch 130F to drive the virtual register number provided upon virtual stI input bus 144 onto SRC2 virtual register bus 132B.

Additionally, the portion of floating point scan circuit 114 shown in FIG. 7 provides an output virtual register number corresponding to register stI on virtual stI output bus 146. A variety of input virtual register numbers may be selectable as the output virtual register number upon output bus 146, controlled by a variety of control signals provided by decode unit 24. The x86 floating point instructions treat the floating point register set as a stack. St0 is the register at the top of the stack, st1 is next to the top, etc. Certain instructions may cause the stack to be pushed (making the current st0 register st1, etc.) or popped (making the current st1 register st0, etc. Still further, an exchange instruction is supported which swaps the top of stack register (st0) and one of the other registers.

The selection of a virtual stI output attempts to handle many of these situations by employing switches 130G–130K and a set of input virtual register buses 144, 148, 150, 152, and 154. If the ROP in the present issue position does not affect the floating point stack or the stI register individually, the pass signal is asserted to switch 130G (connected between virtual stI input bus 144 and virtual stI output bus 146) and the virtual stI input is provided as the virtual stI output. On the other hand, if the ROP in the present issue position updates the stI register, the write signal is asserted to switch 130J (connected between bus 152 and bus 146), and the virtual register number corresponding to the present issue position (conveyed upon bus 152) is transmitted upon virtual stI output bus 146. If the ROP in the current issue position causes a stack push or pop, corresponding signals are asserted to switches 130K (connected between bus 154 and bus 146) and 130I (connected between bus 152 and bus 146) respectively. Virtual register numbers corresponding to the stI−1 and stI+1 registers within the updated lookahead state provided to the present issue position are thereby provided. Finally, the virtual st0 input from the issue position two prior to the present issue position is provided upon bus 148. If the present ROP is the second half of an FEXC instruction, the EXCH signal is asserted to switch 130H and the virtual register number corresponding to st0 from the issue position two prior to the present issue position is selected as the virtual stI output.

It is noted that, to handle the first half of the FEXC instruction, the portion of floating point scan circuit 140 corresponding to st0 may include each of the virtual stI inputs from the previous scan unit, to arbitrarily select any register as the virtual st0 output. It is further noted that the top of stack (TOS) field of the floating point status register and the floating point tag word are affected by floating point manipulations as well. Lookahead values for the TOS and tag word may be propagated through pushes, pops, and exchanges as well. A current lookahead copy of the TOS and tag word may be maintained in lookahead register state 84. Furthermore, the value of the TOS and tag word corresponding to each issue position may be stored in map silo 32 for exception recovery (and the last value may be updated into lookahead register state 84). Still further, register scan unit 80 may detect the use of a register which is invalid (as indicated by the tag word) and note an exception with the ROP using the register for later exception handling.

It is noted that integer/temporary scan circuit 110 and floating point scan circuit 140 may handle integer to floating point and floating point to integer moves as well. If a source register of an ROP is indicated to be integer, integer/temporary scan circuit 110 provides the source virtual register number. On the other hand, if the source register of an ROP is indicated to be floating point, floating point scan circuit 140 provides the source virtual register number. If a destination register is indicated as floating point, a new floating point virtual register number is provided into the updated lookahead register state by floating point scan circuit 140. On the other hand, if a destination register is indicated as integer, a new integer virtual register number is provided into the updated lookahead register state by integer/temporary scan circuit 110. Accordingly, an issue position having a floating point to integer register move is assigned a floating point source virtual register number and the destination register number indicates integer. On the other hand, an issue position having an integer to floating point register move is assigned an integer source virtual register number and the destination register number indicates floating point.

Turning now to FIG. 8, a block diagram of one embodiment of virtual/physical register map unit 86 is shown. Other embodiments are possible and contemplated. In the embodiment of FIG. 8, virtual/physical register map unit 86 includes a source IQ# mux 160, a next lookahead IQ# mux 162, a source PR# mux 164, a next lookahead PR# mux 168, a trap IQ# mux 170, and a trap PR# mux 172. Source IQ# mux 160 is connected to receive the current lookahead IQ# corresponding to each logical register from lookahead register state 84, and to receive the destination IQ#s assigned by IQ#/PR# control unit 82. Next lookahead IQ# mux 162 is similarly connected to receive the current lookahead IQ#s and destination IQ#s. The output of source IQ# mux 160 is pipelined to instruction queues 36A–36B, while the output of next lookahead IQ# mux 162 is connected as an input to trap IQ# mux 170. Trap IQ# mux 170 is further connected to recovery lookahead register state bus 76A (a portion of recovery lookahead register state bus 76 conveying the IQ#s to be recovered). Source PR# mux 164 is connected to receive the current lookahead PR# corresponding to each logical register from lookahead register state 84, and to receive the destination PR#s assigned by IQ#/PR# control unit 82. Next lookahead PR# mux 168 is similarly connected to receive the current lookahead PR#s and the destination PR#s. The output of source PR# mux 164 is pipelined to instruction queues 36A–36B. The output of next lookahead PR# mux 168 is connected to a trap PR# mux 172, which is further connected to recovery lookahead register state bus 76B (a portion of recovery lookahead register state bus 76 conveying the PR#s to be recovered). The source virtual register numbers assigned by register scan unit 80 are provided as selection controls to source IQ# mux 160 and to source PR# mux 164. The virtual next lookahead state is provided as selection controls to next lookahead IQ# mux 162 and next lookahead PR# mux 168. Trap controls from PC silo 48 provide selection controls for trap IQ# mux 170 and trap PR# mux 172.

Generally, source IQ# mux 160 and source PR# mux 164 select the source IQ# and PR# for each source operand of each ROP responsive to the corresponding source virtual register number provided by register scan unit 80. Mux 160 may be implemented, for example, as a parallel set of muxes (one for each source register of each ROP) connected to receive the inputs as shown for mux 160 and receiving a corresponding source virtual register number as a selection control. Similarly, mux 164 may be implemented as a parallel set of muxes (one for each source register of each ROP) connected to receive the inputs as shown for mux 164 and receiving a corresponding source virtual register number as a selection control. If the source virtual register number indicates that the current lookahead state is the source for the IQ#/PR#, then the logical register number included in the source virtual register number is used to select one of the IQ# and PR# provided by lookahead register state 84. On the other hand, if the source virtual register number indicates a prior issue position, the issue position number is used to select one of the destination IQ#/PR# assigned by control unit 82. Control unit 82 may provide, for example a destination IQ# and PR# corresponding to each issue position. On the other hand, control unit 82 may provide a limited number of IQ# and PR# (less than the number of ROPs in a line). In such an embodiment, logic may be performed upon the source virtual register number and the destination register valid indications for each ROP to select one of the destination IQ#/PR# combinations.

Similarly, next lookahead IQ# mux 162 and next lookahead PR# mux 168 select the IQ# and PR# for each logical register responsive to the corresponding virtual next lookahead state provided by register scan unit 80. Mux 162 may be implemented, for example, as a parallel set of muxes (one for each logical register) connected to receive the inputs as shown for mux 162 and receiving a corresponding virtual register number as a selection control. Similarly, mux 168 may be implemented as a parallel set of muxes (one for each logical register) connected to receive the inputs as shown for mux 168 and receiving a corresponding virtual register number as a selection control. If the virtual register number indicates that the current lookahead state is the source for the IQ#/PR# of a particular logical register, then the logical register number included in the virtual register number is used to select one of the IQ# and PR# provided by lookahead register state 84. On the other hand, if the virtual register number indicates an issue position, the issue position number is used to select one of the destination IQ#/PR# assigned by control unit 82.

An advantage may be achievable by physically separating the selection of IQ#s and PR#s based on virtual register numbers as illustrated in FIG. 8. A relatively large number of buses are routed to a relatively small amount of circuitry (i.e. muxes represented by muxes 160, 162, 164, and 168). Accordingly, the amount of area occupied by virtual/physical register map unit 86 may be dominated by the buses from lookahead register state 84 and IQ#/PR# control unit 82. Since the IQ# and PR# are separate values, routing the values to separate sets of muxes may result in a reduction in area occupied by virtual/physical register map unit 86. In one embodiment, the number of bits in an IQ# and the number of bits in a PR# may be approximately the same. Accordingly, wiring the IQ# buses on one side of virtual/physical register map unit 86 and wiring the PR# buses on the other side of virtual/physical register map unit 86 may result in a fairly symmetrical layout in which the wiring space on both sides is efficiently used. Furthermore, instruction queues 36A–36B may be physically divided into a scheduling portion (which receives the IQ#s for determining when the ROPs upon which the current ROPs are dependent have completed and hence one of the current set of ROPs may be scheduled) and an instruction storage (which stores the PR#s and other information used for instruction execution, but does not store the IQ#s). Accordingly, instruction queues 36A–36B may physically be constructed with the scheduling portion near the IQ# muxes and the instruction storage portion near the PR# muxes, further enhancing area savings.

Virtual/physical register map unit 86 as shown in FIG. 8 further handles the mapping of a next lookahead register state for lookahead register state 84 in response to exception conditions. Trap IQ# mux 170 is used when traps are recognized upon execution to route the IQ#s corresponding to the recovery lookahead register state from map silo 32 to override the next lookahead state provided by mux 162. PC silo 48 may signal the trap as a selection control upon mux 170. Similarly, the PR# within the recovery lookahead register state may be selected through trap PR# mux 172 responsive to the trap signal. It is noted that, in other embodiments, other methods for recovering from exception conditions may be employed. For example, exception conditions may be handled upon retirement.

Turning now to FIG. 9, a table 180 illustrating the information stored in an entry within map silo 32 (i.e. an entry corresponding to a line of ROPs) is shown. Other embodiments are possible and contemplated.

As shown in table 180, an R# corresponding to the line is stored in an R# (line portion) field. The R# stored is the line portion of the R#s assigned by PC silo 48 to the line of ROPs. The line portion is the same for each ROP within the line, while an offset portion of the R# identifies the issue position within the line of a particular ROP. Accordingly, the silo entry (which corresponds to the line as a whole) can be associated with an ROP experiencing an exception by comparing the line portion of the R# for the ROP with the stored R#.

Additionally, an indication of which ROPs within the line are valid is stored in a valid ROPs within Line field of the map silo entry. For example, the indication may be a bit per ROP. If the bit is set, the corresponding ROP within the line is valid. If the bit is clear, the corresponding ROP within the line is not valid. Still further, an indication of which ROPs have a destination logical register is stored in a ROP register writes field. Again, the indication may be a bit per ROP. If the bit is set, the corresponding ROP within the line updates a destination register. If the bit is clear, the corresponding ROP within the line does not update the destination register. The indication of which ROPs have a destination register is used to decide which of the assigned PR#s and assigned IQ#s become part of the recovery state in the event of an exception, as described below.

The PR#s and IQ#s assigned to the ROPs which have destination registers are maintained in assigned PR# and assigned IQ# fields of the entry, respectively. Additionally, the logical register number of each destination register is stored in a logical register numbers field. The logical register numbers are used to determine which logical register within the recovery lookahead state are to receive the assigned PR#s and assigned IQ#s, as described below. Additionally, upon successful retirement of the line, the logical register numbers and corresponding PR#s are conveyed to architectural renames block 34 for storage.

An indication of which ROPs within the line update the condition code register is stored in a CC writes field. Each portion of the condition code which is updated separately may be represented by a bit within the CC writes field, and a set of bits may be associated with each register write indicated within the ROP register writes field. The PR# and IQ# of the corresponding ROP (stored in the assigned PR# and IQ# fields) may be used to recover the lookahead condition code register within the lookahead register state upon detection of an exception. Additionally, the CC writes field indicates which PR#s within the assigned PR#s field correspond to the architected condition code state upon successful retirement of the line of ROPs. As mentioned above, in the present embodiment a single physical register is used to store both an integer register update and corresponding condition code updates.

The current lookahead register state stored within lookahead register state 84 prior to dispatching the line of ROPs corresponding to the map silo entry is stored in a current lookahead register state field of the entry. The current lookahead register state serves as a basis for recovering lookahead register state 84 in the event of an exception within the line.

Finally, the FP TOS and valid bits corresponding to each issue position are stored within a FP TOS and valid bits field of the entry. The FP TOS and valid bits corresponding to an ROP experiencing an exception are restored into the lookahead FP TOS and tag word within lookahead register state 84 upon detecting an exception.

Figure 10:
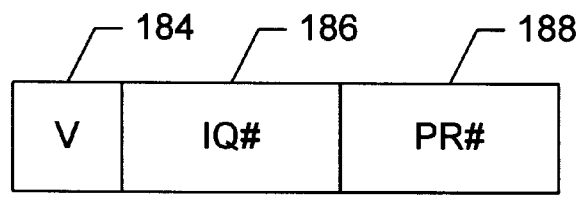
FIG. 10 is a block diagram illustrating an exemplary lookahead register state for a logical register.

Turning now to FIG. 10, a block diagram of an exemplary lookahead register state entry 182 which may be employed by one embodiment of lookahead register state 84 for a logical register is shown. Entry 182 includes a valid field 184, an IQ# field 186, and a PR# field 188. Valid field 184 indicates whether or not IQ# field 186 is valid. An IQ# is valid until the corresponding ROP is completed from instruction queues 36A–36B. Accordingly, lookahead state 84 may receive indications from execution cores 40 and load/store unit 42 of which IQ#s are completing. Upon detecting a match, lookahead state 84 may reset the valid indication. The valid indication may be a bit, for example, indicating valid if set and invalid if clear. IQ# field 186 stores the IQ# of the ROP which most recently updated the logical register, and PR# field 188 stores the PR# of the physical register allocated as a destination register to the ROP.

Figure 11:
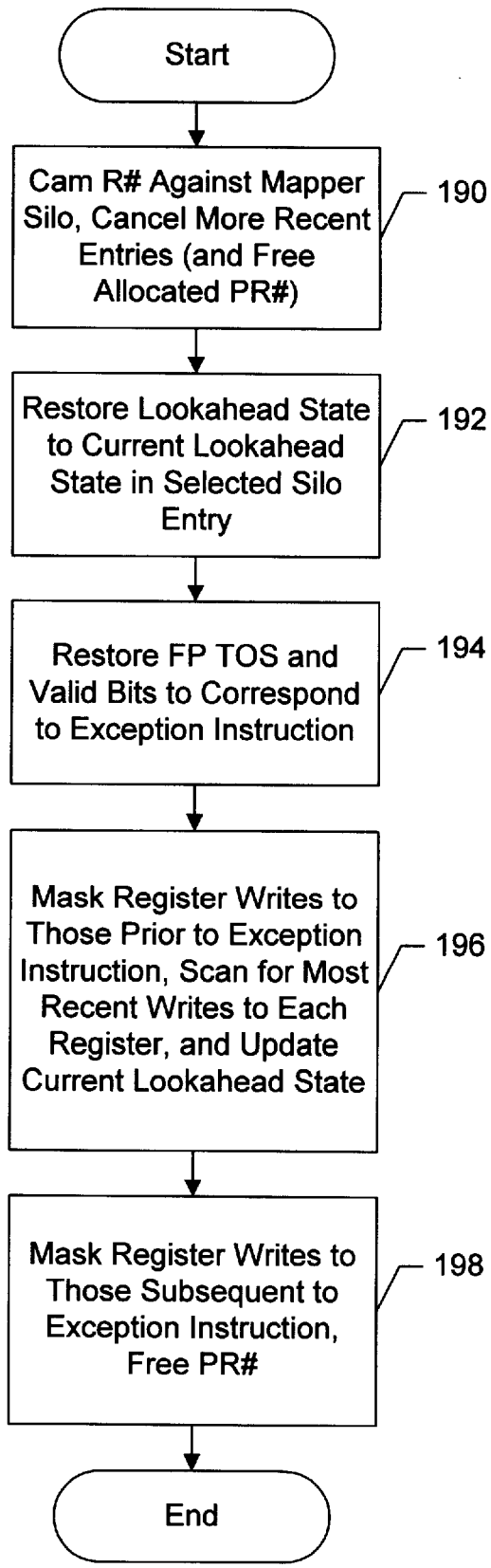
FIG. 11 is a flowchart illustrating restoring lookahead state according to one embodiment of the map unit shown in FIGS. 1, 2, and 3.

Turning next to FIG. 11, a flowchart is shown illustrating the operation of map silo 32 in response to an exception condition signalled by PC silo 48. Other embodiments are possible and contemplated. While the steps shown in FIG. 11 are illustrated in a particular order for ease of understanding, any suitable order may be employed. Furthermore, steps may be performed in parallel in combinatorial logic employed within map silo 32.

As illustrated at step 190, map silo 32 cams the R# provided by PC silo 48 against the R# (line portion) field of the entries stored in map silo 32. The R# provided by PC silo 48 identifies a particular ROP. However, for purposes of checking against map silo 32, the line portion of the R# is cammed. Entries which are more recent than the provided R# (i.e. instructions subsequent to the exception in program order) are cancelled within map silo 32. The PR# stored in the assigned PR# field of the cancelled entries are freed. In one embodiment, the PR#s of the cancelled entries are freed over multiple clock cycles, at the rate of one entry per clock cycle. The silo entry for which the cam indicates a match is the selected map silo entry.

The current lookahead register state stored in the selected map silo entry (i.e. the current lookahead state prior to the line of ROPs including the ROP experiencing the exception is restored to the lookahead state in current lookahead register state 84 (step 192). Additionally, the FP TOS and valid bits in lookahead register state 84 are restored to the value stored in the selected map silo entry for the issue position of the ROP experiencing the exception (step 194).

The ROP register writes field in the selected map silo entry is masked to the writes which are prior to the ROP experiencing the exception. In other words, ROP register writes which are subsequent to the ROP experiencing the exception are masked off, such that they do not appear to be writes subsequent to the masking. The remaining writes (subsequent to the masking) are scanned to detect the most recent write to each register (i.e. if two or more of the remaining writes are to the same register, the more recent write is retained). The current lookahead state is updated with the results (step 196). It is noted that step 192 and step 196 may be performed in map silo 32 prior to transmitting a recovery lookahead register state to lookahead register state 84. Alternatively, the current lookahead register state may be restored to lookahead register state 84 and subsequently updated with respect to step 196.

Still further, the ROP register writes field in the selected map silo entry (i.e. the original value prior to the masking of step 196) is masked to the register writes which are subsequent to the ROP experiencing the exception. In other words, the register writes which are prior to the ROP experiencing the exception are masked off. The PR#s of the remaining register writes are freed (step 198). The flowchart shown in FIG. 11 may advantageously provide a rapid method for recovering the lookahead state in response to the exception.

It is noted that the terms source virtual register number and virtual source register number may have been used above. It is intended that these terms have the same meaning. It is further noted that, as mentioned above, embodiments in which each instruction specified in the instruction set architecture employed by processor 10 maps to a single instruction operation are contemplated within the meaning of instruction operation as defined herein.

Figure 12:
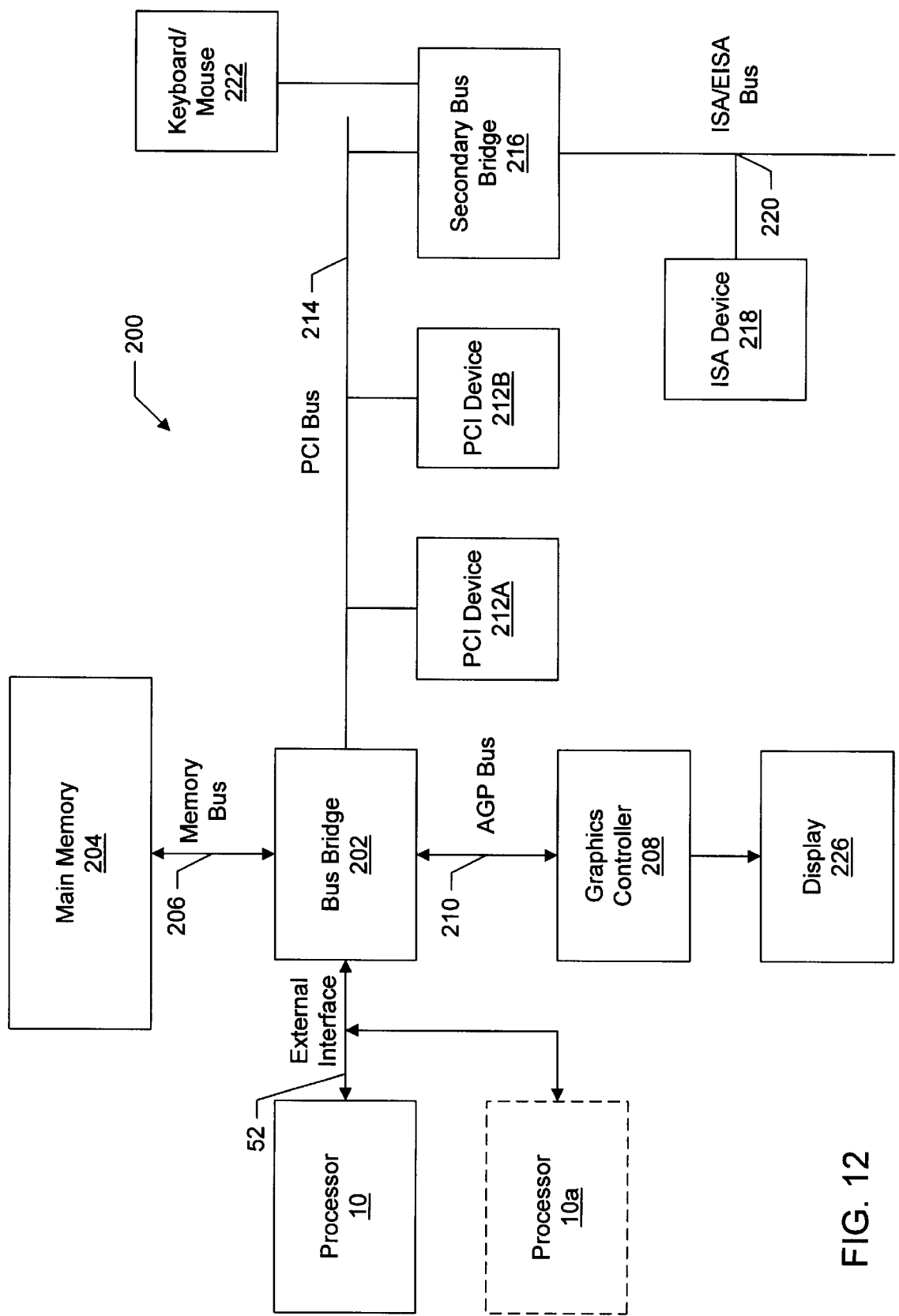
FIG. 12 is a block diagram of one embodiment of a computer system including the processor shown in FIG. 1.

Turning now to FIG. 12, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to external interface 52 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share external interface 52 with processor 10 (as shown in FIG. 12) or may be connected to bus bridge 202 via an independent bus.

In accordance with the above disclosure, a processor has been shown which employs a register renaming scheme. In one embodiment, the renaming scheme is split into stages using a virtual register number. Advantageously, high frequency operation may be possible using the scheme. In another embodiment, a rapid recovery from exceptions is performed by siloing a current lookahead state corresponding to each line of ROPs, and noting the register writes within the line. In yet another embodiment, the freeing of rename registers is managed to allow the same rename register to correspond to more than one logical register. Efficient physical register usage may thereby be employed.

Numerous variations and modifications will become apparent to those skilled in the art once the above disclosure is fully appreciated. It is intended that the following claims be interpreted to embrace all such variations and modifications.

What is claimed is:

1. A method for recovering a lookahead register state in a processor, the method comprising:

storing a lookahead register state in a silo, said lookahead register state corresponding to a plurality of logical registers employed by said processor, said lookahead register state corresponding to a state of said plurality of logical registers prior to a line of instruction operations;

storing physical register numbers assigned to destination operands within said line of instruction operations in said silo;

storing logical register numbers corresponding to said destination operands within said line of instruction operations in said silo;

detecting an exception condition upon executing a particular instruction operation within said line of instruction operations;

restoring said lookahead register state corresponding to said line of instruction operations from said silo responsive to said detecting; and selectively updating said lookahead register state responsive to said physical register numbers and said logical register numbers stored in said silo.

2. The method as recited in claim 1 wherein said selectively updating comprises masking off physical register numbers and logical register numbers corresponding to instruction operations within said line of instruction operations but subsequent to said particular instruction operation and updating said lookahead register state with remaining physical register numbers according to remaining logical register numbers.

3. The method as recited in claim 2 further comprising scanning said remaining logical register numbers to identify the last update to each logical register number and storing said last update in said lookahead register state.

4. The method as recited in claim 1 further comprising selectively freeing physical register numbers corresponding to said line of instruction operations responsive to said detecting.

5. The method as recited in claim 4 wherein said selectively freeing comprises masking off said physical register numbers corresponding to instruction operations within said line of instructions and prior to said particular instruction operation and freeing remaining ones of said physical register numbers.

6. The method as recited in claim 1 further comprising storing a second lookahead register state in said silo, said second lookahead register state corresponding to a state of said plurality of logical registers prior to a second line of instruction operations which are subsequent to said first line of instruction operations in program order.

7. The method as recited in claim 6 further comprising:

storing physical register numbers assigned to destination operands within said second line of instruction operations in said silo;

storing logical register numbers corresponding to said destination operands within said second line of instruction operations in said silo.

8. The method as recited in claim 7 further comprising discarding said second lookahead register state responsive to said detecting.

9. The method as recited in claim 8 further comprising freeing said physical register numbers assigned to destination operands within said second line of instruction operations responsive to said detecting.

10. A processor comprising:

a map unit configured to maintain a lookahead register state corresponding to a plurality of logical registers, said lookahead register state defining a physical register number corresponding to each of said plurality of logical registers, wherein said register map unit is configured to update said lookahead register state responsive to destination operands corresponding to a line of instruction operations; and a silo configured to capture said lookahead register state prior to said map unit updating said lookahead register state responsive to said destination operands (a prior lookahead state), and wherein said silo is configured to retain said prior lookahead state as well as a plurality of physical register numbers assigned to said destination operands by said map unit and a plurality of logical register numbers specified by said destination operands, and wherein said silo, upon receiving an exception indication corresponding to a particular instruction operation within said line of instruction operations, is configured to restore said lookahead register state maintained by said map unit to said prior lookahead register state and to selectively update said lookahead register state responsive to said plurality of physical register numbers and said plurality of logical register numbers corresponding to said line of instruction operations.

11. The processor as recited in claim 10 wherein said silo is configured to mask off ones of said plurality of physical register numbers and said plurality of logical register numbers corresponding to instruction operations within said line of instruction operations and subsequent to said particular instruction operation and to update said lookahead register state with remaining ones of said plurality of physical register numbers according to remaining ones of said plurality of logical register numbers.

12. The processor as recited in claim 11 wherein said silo is further configured to scan said remaining ones of said logical register numbers to update said lookahead register state with a last update to a particular one of said plurality of logical register numbers.

13. The processor as recited in claim 10 wherein said silo is further configured to selectively free said plurality of physical register numbers responsive to said exception indication.

14. The processor as recited in claim 13 wherein said silo is configured to mask off ones of said plurality of physical register numbers corresponding to instruction operations within said line of instruction operations and prior to said particular instruction operation, and to free remaining ones of said plurality of physical register numbers.

15. A computer system comprising:

a processor comprising:

a map unit configured to maintain a lookahead register state corresponding to a plurality of logical registers, said lookahead register state defining a physical register number corresponding to each of said plurality of logical registers, wherein said register map unit is configured to update said lookahead register state responsive to destination operands corresponding to a line of instruction operations; and a silo configured to capture said lookahead register state prior to said map unit updating said lookahead register state responsive to said destination operands (a prior lookahead state), and wherein said silo is configured to retain said prior lookahead state as well as a plurality of physical register numbers assigned to said destination operands by said map unit and a plurality of logical register numbers specified by said destination operands, and wherein said silo, upon receiving an exception indication corresponding to a particular instruction operation within said line of instruction operations, is configured to restore said lookahead register state maintained by said map unit to said prior lookahead register state and to selectively update said lookahead register state responsive to said plurality of physical register numbers and said plurality of logical register numbers corresponding to said line of instruction operations; and an input/output (I/O) device coupled to said processor, wherein said I/O device is configured to communicate between said computer system and another computer system to which said I/O device is coupled.

16. The computer system as recited in claim 15 further comprising a second processor including:

a map unit configured to maintain a lookahead register state corresponding to a plurality of logical registers, said lookahead register state defining a physical register number corresponding to each of said plurality of logical registers, wherein said register map unit is configured to update said lookahead register state responsive to destination operands corresponding to a line of instruction operations; and a silo configured to capture said lookahead register state prior to said map unit updating said lookahead register state responsive to said destination operands (a prior lookahead state), and wherein said silo is configured to retain said prior lookahead state as well as a plurality of physical register numbers assigned to said destination operands by said map unit and a plurality of logical register numbers specified by said destination operands, and wherein said silo, upon receiving an exception indication corresponding to a particular instruction operation within said line of instruction operations, is configured to restore said lookahead register state maintained by said map unit to said prior lookahead register state and to selectively update said lookahead register state responsive to said plurality of physical register numbers and said plurality of logical register numbers corresponding to said line of instruction operations.

* * * * *